[redacted]

[redacted]

United States Patent

Re. 28,337
Reissued Feb. 11, 1975

28,337

TELEPHONE SWITCHING SYSTEM WITH PROGRAMMED AUXILIARY CONTROL FOR PROVIDING SPECIAL SERVICES

Fred J. Singer, Chatham, N.J., assignor to Northern Telecom Inc., Boston, Mass.

Original No. 3,555,196, dated Jan. 12, 1971, Ser. No. 669,436, Sept. 21, 1967. Application for reissue Feb. 22, 1974, Ser. No. 444,785

Int. Cl. H04q *3/54*

U.S. Cl. 179—18 ES 33 Claims

Matter enclosed in heavy brackets [ ] appears in the original patent but forms no part of this reissue specification; matter printed in italics indicates the additions made by reissue.

ABSTRACT OF THE DISCLOSURE

A wired logic common control telephone system which has a program controlled auxiliary control system or central programmed control unit operating in consort therewith for particular calls, in order that special features and Centrex operation can be provided to subscribers. For certain call features, interface to the program controlled control unit is made from the marker via a number group connector upon designation of a particular class of service; for others a special circuit which splits a certain type of junctor provides access to an auxiliary interline switching means which is controlled by the program controlled control system, and is activated by a signal from the subscriber whose line is terminated on the common control system. For Centrex operation, a private branch exchange or a remote switching unit is terminated via trunk circuits on a line-link frame in the common control system, and is controlled by the main office program controlled control system.

This invention relates to a telephone switching system which utilizes a wired logic common control type of switching system for normal interconnection of subscribers, in combination with a programmed logic applique system operated in consort therewith when certain predesignated types of special telephone calls available to predetermined subscribers are to be setup.

There are in common use today three general types of telephone switching systems. The first type of system is pulse actuated, whereby a transmission path through the switching system is selected as pulses are generated in a subscriber's station set. The most common system of this type uses the well known Strowger switch in step-by-step system.

The second type of switching system utilizes a controlling means in common for all transmission path switching within the system, which operates after all the dialing pulses (rather than each pulse) are received from a subscriber's station set, to find an idle path from the dialing subscriber's line circuit to a trunk or to another subscriber's line cricuit. This type of system, although much more economical and versatile in its use of controlling equipment with respect to switching equipment, utilizes wired logic for direction of the common control. When one or more subscribers require additional nonstandard features, for instance the ability to initiate a conference call, extensive wiring changes must be made to the common control. Such changes have been found to be expensive and complex, and as the number of changes increases, the probability of connection errors also increases.

The third type of telephone switching system utilizes a common control, but contains a readily changeable operation program which directs a central controller in its performance of switching supervision duties. This type of system has evolved utilizing electronic techniques and time division operation rather than space division operation and indeed, the central common control has many similarities to modern special-purpose digital computers. It will be referred to herein as a program controlled system. The provision of additional features or changes to a particular subscriber's line is easily effected with this type of system by simply changing the program, which is stored in a memory in the central control. Two general types of these systems have evolved, one for large city central switching offices, and another economical for use in private branch exchanges (referred to below as a PBX). A typical system of the latter type is disclosed in U.S. Pat. No. 3,225,144 to R. C. Gebhardt et al. issued Dec. 21, 1965, and Bell Laboratories Record, Feburary 1963, p 43; December 1963, p 425; February 1964, p. 61; and November 1964, p. 374.

Telephone switching offices often have a lifetime of 20 to 40 years. It is evident that to replace a recently installed common control telephone switching system by an electronic program controlled telephone switching system to provide services and features not feasible with the common control system may often prove uneconomical and, in fact, may result in financial loss. Thus subscribers connected to such a common control switching system may be deprived of the advantageous features provided economically by a program controlled system. It would thus be extremely advantageous if a way were found to facilitate simple addition of program controlled features to a common control system, without incurring the loss caused by the complete dismantling of the common control system in favor of a program controlled system.

I have invented a telephone switching system which allows program control of special types of telephone calls which may be requested by predetermined subscribers on a common control system. This telephone switching system comprises a first transmission path, a second transmission path, switching means interconnecting the first and second transmission paths, a common controlling means for causing the interconnection of selected ones of the first and second transmission paths, and a programmed controlling means connected to the common controlling means for modifying the operation of the common controlling means in response to the reception of predetermined signals received over predetermined ones of the first transmission paths. Thus it may be seen that the provision of special features for the system is taken over by a programmed central control whose program is readily modifiable, and which operates in consort with the common control equipment of a present central office installation. Generally, therefore, this invention consists of a telephone switching system comprising a common controlled switching means and applique programmed controlling means connected to said switching means during the processing of predetermined types of telephone calls for modifying the operation thereof in a predetermined manner, in accordance with certain types of requests for service.

It will become obvious to one skilled in the art, understanding this specification that the techniques involved may be applied to well-known types of common control systems, and that the central programmed controlling means can be built around a general purpose digital computer. However, this description will refer specifically to the common control telephone switching system described in U.S. Pat. No. 2,585,904 to A. J. Busch, issued Feb. 19, 1952 and to the PBX type of program control system described in U.S. Pat. No. 3,225,144 to R. C. Gebhardt et al. issued Dec. 21, 1965.

Detailed descriptions of these well-known systems would obscure the specific inventive system concept described herein, and the reader is referred to the aforementioned patents for details as to their structure. However, where interconnections with those systems are required for this invention, a description will be fully disclosed. In addition, as the invention described herein is a system concept, the details of specific logic gate interconnections, methods of causing cross-bar switches to operate, and certain blocks used in the combination are considered well known by those skilled in the art and will not be described in detail, since to describe the specific structure of these well-known pieces of equipment would also only serve to obscure the system invention described herein.

A better understanding of this invention may be obtained by referring to the figures listed below.

FIGS. 4 and 5 are two portions of one block diagram showing the basic system invention in more detail than that of FIG. 1;

FIGS. 10 to 16 are portions of a detailed block schematic of this invention, fitted according to the mosaic shown in FIG. 3.

Figure 1:
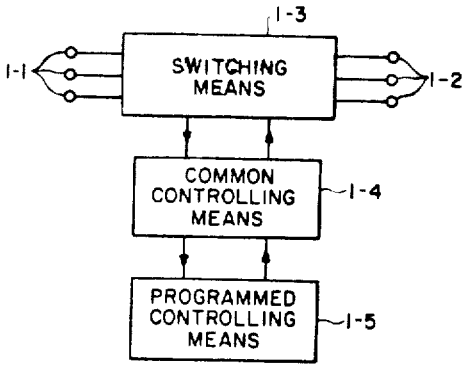
FIG. 1 is a block diagram showing the basic system arrangement of this invention.

In this specification, where reference numerals are used relating to new apparatus required by this invention, they are designated by a numeral with no lettered prefix. The numeral will consist of a first digit or digits designating the sheet on which the particular element may be found, followed by a dash and the remainder of the number which designates in numerical order for that sheet the element itself. If, for instance, in FIG. 9 the element 7–23 is referred to, it will be recognized that the element 7–23 is primarily related to, and found on sheet 7.

For numerals having a prefix G (for instance G406), it will be recognized that this numeral relates to the Gebhardt et al. patent, which contains its own numbering system. This example relates to element 406, on page 4 of the drawings of the Gebhardt et al. patent.

The invention will be described according to the following general arrangement, in the order shown:

INDEX

1. General Description
   - 1.1. Common Control System
   - 1.2. Program Control System
   - 1.3. Interface Equipment
2. General Operation
   - 2.1. Abbreviated Dialing
   - 2.2. Variable Transfer
   - 2.3. Remote Switching Unit
   - 2.4. Dial Transfer
   - 2.5. Add-on
   - 2.6. Conference Connections
3. Detailed Description 4. Detailed Operation
   - 4.1. Abbreviated Dialing
   - 4.2. Variable Transfer
     - 4.2.1. Registration of Transfer Information
     - 4.2.2. Request for Connection
     - 4.2.3. Registration of Original Line Location Number
   - 4.3. Remote Switching Unit
   - 4.4. Dial Transfer
   - 4.5. Add-on

1. GENERAL DESCRIPTION

FIG. 1 is a block diagram showing the interrelationship of elements defining the basic concept of this invention. First transmission paths 1—1 and second transmission paths 1–2 are interconnected by a switching means 1–3. A common controlling means 1–4 operates at various stages during the processing of a call, causes the interconnection of the first transmission paths 1—1 to the second transmission paths 1–2. Of course it will be recognized that the first transmission paths can be trunks, subscriber line circuits, data links etc., while the second transmission paths can be similarly designated circuits and may be intended to be connected to other central offices. A programmed controlling means 1–5 is connected to, and operates in consort with the common controlling means 1–4 under certain predetermined circumstances.

When a normal telephone call or request for switching from a first transmission path 1—1 to a second transmission path 1–2 is required, the common controlling means 1–4 operates the switching means 1–3 in a normal manner using its wired logic without requiring the use of programmed controlling means. However, when a first transmission path 1—1, to which special services may be offered, requests such a special service call, the common controlling means 1–4 requests the programmed controlling means 1–5 to interpret and act in consort therewith, causing it to modify its normal operation, thus allowing such special call to be placed.

Since the traffic handling requirements for special service calls are substantially less than for the general traffic in a common control telephone switching system, the programmed controlling means 1–5 need only be large or fast enough to handle such traffic, and thus only have a fraction of the traffic capacity of the common controlling means 1–4. Furthermore, if the programmed controlling means 1–5 is provided with capacity larger than that required by the single common control switching office, it can easily provide service to more than one common control switching office, as well as to one or more remote community, or PBX switching units.

It should be emphasized that since the program controlling means 1–5 operates in consort with and is connected to the common controlling means 1–4, the interconnection of various services to a subscriber is extremely fast, and thus satisfactory to the subscriber. Another known system for providing programmed logic control of Centrex calls and Centrex calls with special services utilizes a technique well known as line-link pulsing, which is uneconomical in utilization of equipment, and requires the use of additional trunks and wired circuits within the common control system for each coinciding request and setup of service. The system described herein utilizing a programmed controlling means obviates the need for line-link pulsing.

1.1. Common Control

Figure 2:
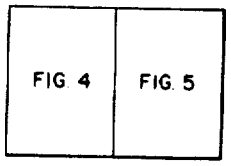
FIG. 2 shows pictorially how
Figure 4:
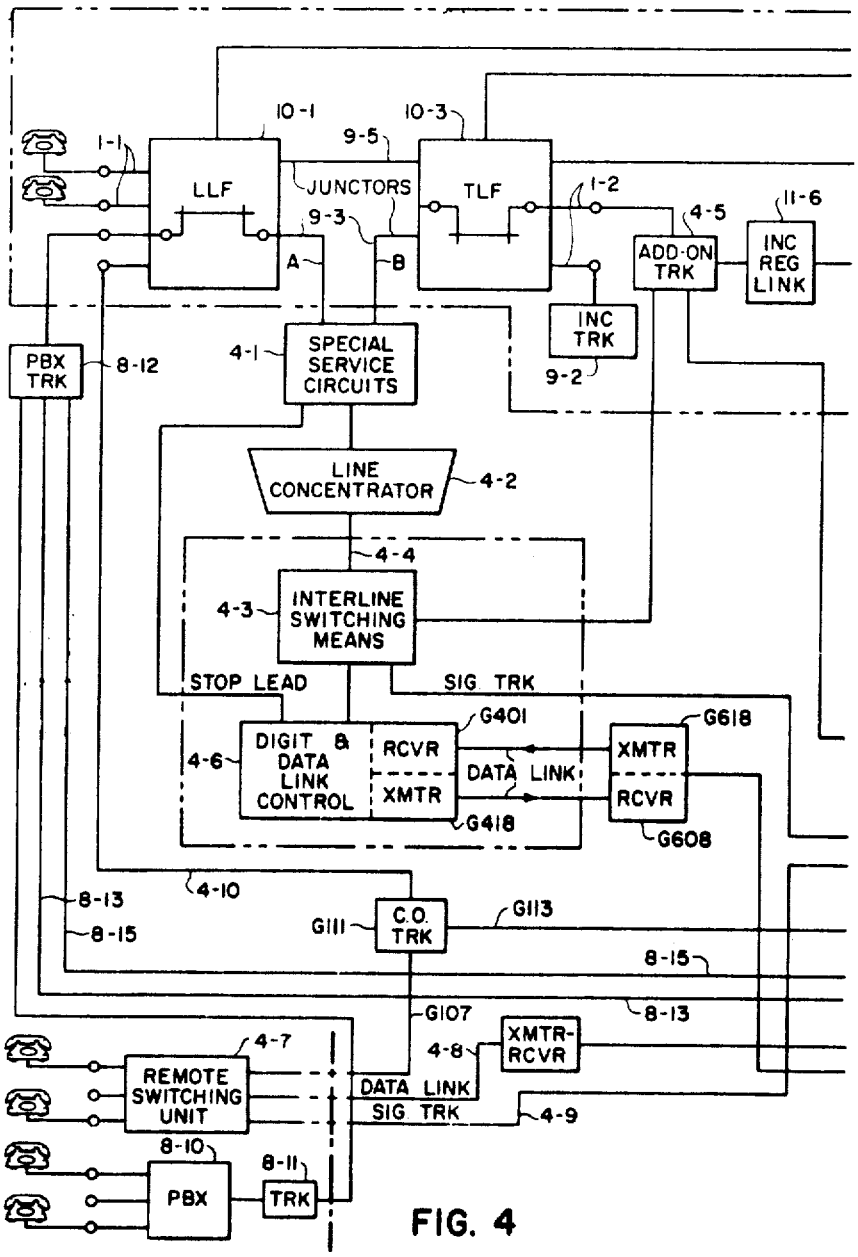
FIGS. 4 and 5 are to be arranged in order to consider them as a single unified drawing.
Figure 5:
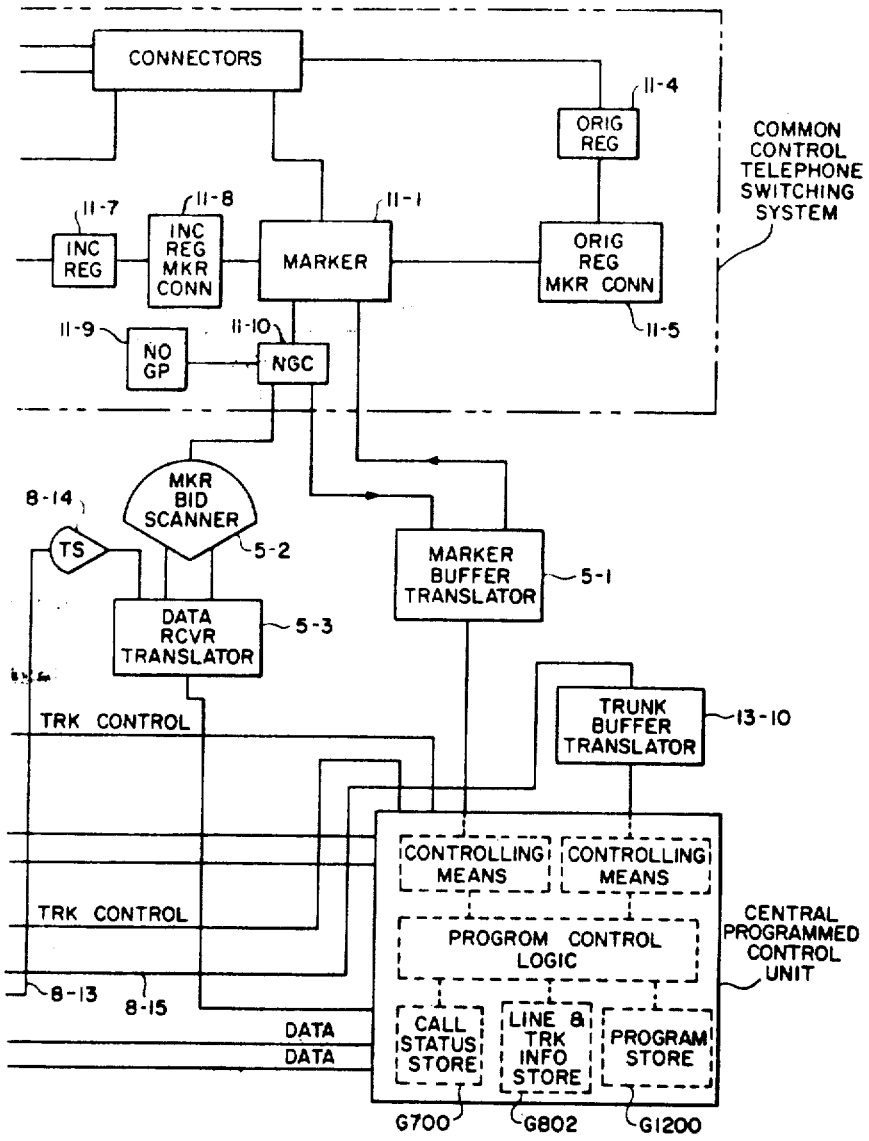

FIGS. 4 and 5 assembled according to the plan shown in FIG. 2, is a more detailed block diagram break down of the invention. A common control telephone switching system is shown which depicts the essential elements of a common control telephone switching system similar to that shown in FIGS. 235 and 236 of the aforementioned A. J. Busch patent, which is well described therein.

First transmission paths 1–1, or line circuits, are connected to link frames (LLF), and second transmission paths 1-2, or trunks, are connected to trunk link frames (TLF). Junctors interconnect line link frames with trunk link frames. A typical originating register (ORIG REG) and marker are connected via various connectors (shown grouped for simplicity of explanation) to the line and trunk link frames. The originating register is connected to the marker via a originating register marker connector (ORIG-REG MKR CONN), and a number group (NO GP), which stores the line locations of subscribers lines on the line link frames and classes of service thereof, is connected via a number group connector (NGC) to the marker. All the equipment used in common by the switching system to cause the line and trunk link frames to interconnect the line circuits and trunks properly, is termed "common control" equipment, and is described in the aforementioned A. J. Busch patent.

1.2. Central Control

Also shown in FIGS. 4 and 5 is a central programmed control unit, which is well described in the aforementioned Gebhardt patent, and is mainly of electronic, rather than electromechanical, nature. The central component block within the control unit contains the logical means for questioning and carrying out the orders stored in various memories, and is termed herein program control logic. Memories connected thereto are a call status store G700, which is a temporary memory for keeping track of what stage in predetermined sequences the status of initiation or processing of call stands, a line and trunk information store G802 connected to the program control logic which keeps track of what the status of the line or trunk requesting or having service is, and a program store G1200, also connected to the program control logic, which is a semipermanent memory which contains the program required for the detailed processing of any predetermined type of call utilizing the central programmed control unit. While the call status store G700 and the line and trunk information store G802 have their contents changed many times during the processing of a cell, the information contained in the program store G1200 remains permanent unless an operator changes it purposefully, for instance to allow the provision of an additional special call feature for a particular subscriber's line.

Various controlling means within the central programmed control unit are actuated by the program control logic as a result of directions translated from aforementioned memories input and output ports for data are provided for the program control logic, essentially for supervisory purposes.

1.3. Interface Equipment

In the first embodiment of this invention a marker buffer translator 5-1 is connected between controlling means actuated by thhe program control logic in the central program control unit, and the marker and number group connector in the common control system.

A marker bid scanner 5-2 is connected between a number group connector, and a data receiver translator (DRT) 5-3, which is further connected into an appropriate data receiving gate in the program control logic.

The combination of the above-described units allows certain type of special service calls, described below, to be provided to subscribers connected to the common control system. A second embodiment of this invention allows certain other types of special services to be provided subscribers.

As shown in FIG. 4, certain junctors which interconnect a line link frame and trunk link frame are modified so as to incorporate special service circuits 4-1 therein. Since the special service circuits are novel to this invention they are fully desrcibed below. A well-known line concentrator 4-2 such as that described in Bell Laboratories Record, September 1965, page 337, interconnects special service circuits 4-1 with an interline switching means 4-3 which can interconnect talking paths between line circuits 4-4. The line circuits 4-4 are connected to transmission path extending through the line concentrator 4-2 or to trunks 4-5.

Figure 3:
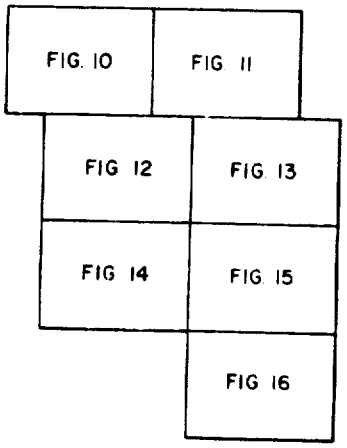
FIG. 3 shows pictorially how

The interline switching means 4-3 can be the PBX switching unit fully described in the aforementioned Gebhardt et al. patent and shown in FIGS. 3 and 4 thereof, transmission paths from the concentrator unit 4-2 and trunk circuits 4-5 terminating as line circuits thereon. A control for the interline switch means 4-3 consisting of a digit and data link control 4-6 generally shown in FIG. 4 of the Gebhardt et al. patent is connected thereto, and is interfaced with the central programmed control unit via transmitters such as G418 and G618 and receivers G401 and G602, similar to the manner described in the aforementioned Gebhardt et al. patent.

A remote switching unit 4-7 external to the above described system combination may also be connected in an advantageous manner. The remote switching unit includes an interline switching means, digit and data link control and signaling and data receive and transmitters similar to the PBX switching unit described above. Connected to its signalling and data receivers and transmitters are signalling trunks and data trunks shown in FIG. 4 as data link 4-8 and signalling trunk 4-9. Signalling trunk 4-9 and data link 4-8 are connected through to the programmed control logic in the central programmed control unit similar to the manner described in the Gebhardt et al. patent.

Shown terminated on the remote switching unit 4-7 is a central office trunk G111, which is connected to one of the line circuits on the line link frame of the common control system, and is controlled from the central programmed control unit via control leads G113.

2. GENERAL OPERATION

A description of the general operation of this invention will be given with reference to FIGS. 6, 7, 8, and 9, which show the essential elements of FIGS. 4 and 5 relating to each special type of call. In order to facilitate the description, six special service types of calls will be described:

a. abbreviated dialing;
b. variable transfer;
c. connection of a remote switching unit;
d. dial transfer;
e. add-on;
f. conference.

2.1 Abbreviated Dialing

Figure 6:
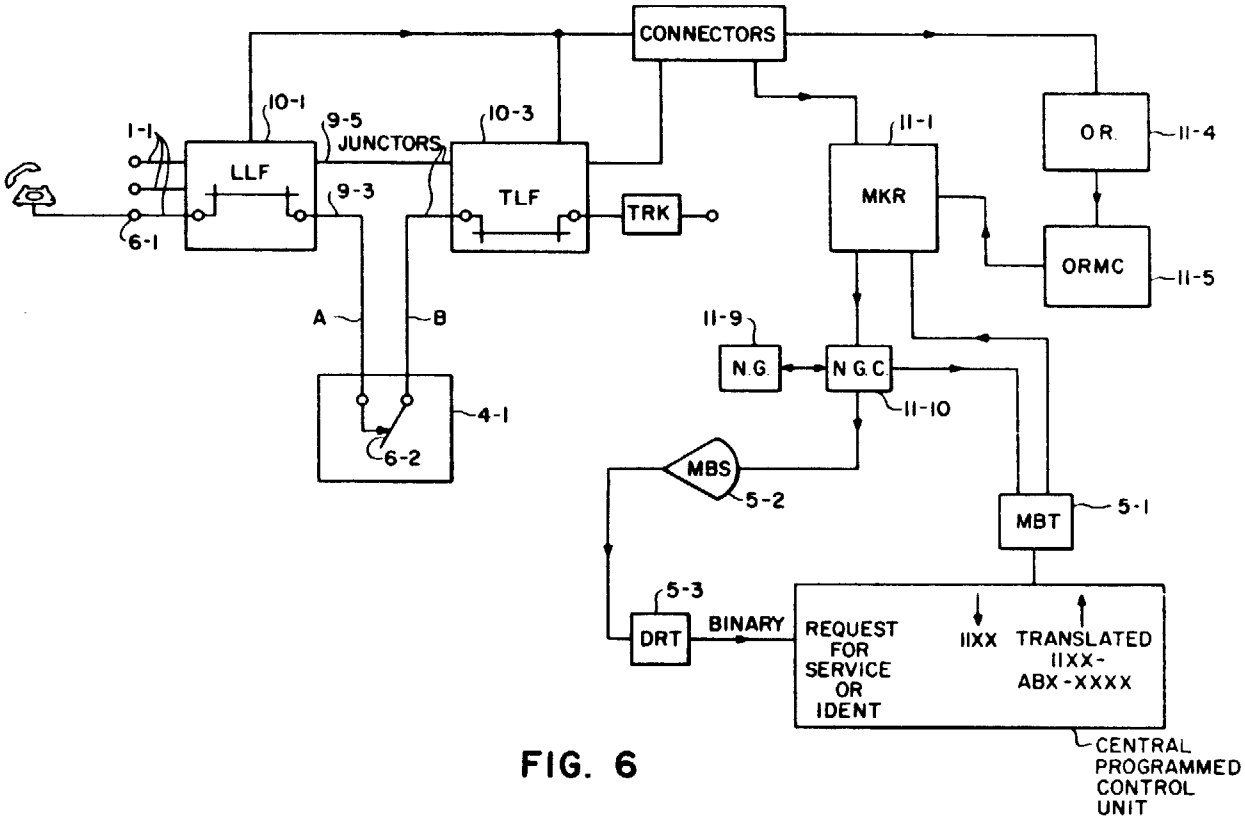
FIG. 6 is a block diagram of this invention showing only those system components necessary during an abbreviated dialing type of call.

A description of abbreviated dialing will follow with reference to FIG. 6. Abbreviated dialing allows a subscriber to contact certain preselected other line locations using fewer digits than are normally required. For instance, a subscriber, instead of dialing 828-2761 may dial 1135, where the digits 11 are a code to the switching office designating that an abbreviated number follows, and where two-digit 35 is a predetermined number taking the place of seven-digit 828-2761. The two digit combination provides the customer a capacity of $10^2$ abbreviated dialing numbers, including 10 digits inter area code numbers. Thus an abbreviated number is generally of the form 11XX where XX is a predetermined 7 or 10 digit number. Of course, other codes than 11 may be utilized.

As is described in the A. J. Bush patent, a subscriber in lifting his handset and releasing his hookswitch initiates a request for service, and the marker MKR, via various connectors, causes an originating register OR to be connected to the subscriber's line 6-1 via the trunk link frame TLF and line link frame LLF. The line location of the calling line 6-1 is passed from the marker into the originating register, in the normal manner. The orginating register applies dial tone through the line link frame and trunk line frame to the calling subscriber's line. If the calling subscriber then dials a normal number, the call is completed in the normal manner by the common control system. Note that all junctors between the line link frame and trunk link frame are proper complete circuit paths.

Assuming now that the subscriber dials the abbreviated code 11XX, the digits and subscriber line location are registered in the originating register. The originating register marker connector then connects a circuit through itself between the orginating register and the marker to transfer the calling line location and [call member] *called number* thereto. The marker then seizes a number group connector NGC and number group NG, in the normal manner, so that it can obtain a translation of the called number location corresponding to the called number and the class of service of the calling line from the number group. The number group attempts to translate the 11XX digits, and if the class of service is proper, it gives an indication to the marker that the central programmed control unit must be called into service. If the class of service indicates that the calling subscriber does not have the abbreviated dialing feature, it indicates to the marker that the calling line should be connected to an appropriate trunk such as one which signals "no such number."

The marker then causes the number group to be dropped, and appropriate switches in the number group connector leading to the marker bid scanner 5–2 (MBS) to be closed. The marker bid scanner 5–2 thus senses that the marker is bidding for service, and identifies the number group connector through which it is bidding. The marker bid scanner 5–2 is connected to a data receiver translator 5–3 (DRT), which transmits the request for service from the identified number group connector into the central programmed control unit, acting similar to the manner described in the aforementioned Gebhardt et al. patent with respect to a response to a request for service over a data link through a data receiver such as G602.

A marker buffer translator 5–1 (MBT) under control of the central programmed control unit is then connected to the number group connector from which the bid for service came, in a manner similar to that for connecting an idle signal receiver such as G501 in the aforementioned Gebhardt et al. patent.

The 11XX number and equipment location number of the calling line is then transferred from the marker storage relays through the number group connector into the register buffer translator 5–1 and thence into the central programmed control unit.

The central programmed control unit senses the prefix code 11 and recognizes that it is a request for an abbreviated dialing type of call, and calls into use its corresponding program. The central programmed control unit, after consulting it's memory, translates the XX code into a corresponding called subscriber's number, for instance, having seven digits, and transfers the translated directory number of the called line as well as the calling line location via the [register] *marker* buffer translator 5–1 into the marker, as if the digits had come from an originating register. The marker drops the connection in the number group connector to the marker bid scanner, and reestablishes the connection to the number group. The number group translates the full called line directory number to its line location.

The marker, in receiving the called line directory number, drops its hold on the number group connector and acts to complete the call in the normal manner as described in the aforementioned A. J. Busch patent. The number group connector thus removes its bid for service on the marker bid scanner 5–2, and the marker buffer translator 5–1 is released from the central programmed control unit, which restores itself, the marker buffer translator 5–1, marker bid scanner 5–2 and data receiver translator 5–3 to an idle condition in order to await the next request for service.

2.2. Variable Transfer

The sequence of events involving a variable transfer type of call will be explained with reference to FIG. 7. Variable transfer is the special feature which allows a predetermined subscriber to have all incoming calls to his line transferred to a preselected different telephone line than his own. The preselection can be made by the subscriber dialing a special code followed by the telephone number of the line he wishes his calls to be transferred to, which we will refer to here as a remote station. All future incoming calls to his line will be transferred to, and automatically ring, the remote station.

A subscriber having the variable transfer feature, whose line is connected to the common control switching system, may initiate a request for service in the normal manner, i.e. by lifting the telephone handset. Again in the manner described in the aforementioned A. J. Busch patent, an originating register is connected through a trunk link frame, junctor, and line link frame to the calling subscriber's line. Dial tone is then returned to the calling subscriber, indicating to him that he may begin dialing.

If the subscriber wishes that all future incoming calls be transferred to a different subscriber's line, for instance designated by telephone number ABX XXXX, thus utilizing his variable transfer feature, he dials the prefix code 12 (or another prefix code predetermined by the telephone company) followed by ABX XXXX. All dialed digits and the calling line location are stored in the originating register 11–4 in the normal manner, the register having enough capacity for the extra two digits.

In addition to the dialed directory number, the originating register 11–4 obtains a class of service indication from the line location of the called line on the line link frame, which is stored along with the dialed directory number in the usual manner. If the class of service indicates that the calling line does not have provision for variable transfer, the marker 11–1 connects the calling line to a trunk which is a source of tone indicating "no such number", and the originating register 11–4 is returned to an idle condition.

However, if the class of service indicates that the calling line does [not] have the variable transfer feature, the marker 11[–4]–*1* is seized from the originating register marker connector 11–5, and the marker 11[–4]–*1* seizes a number group 11–9 through a number group connector 11–10 for translation of the dialed directory number to call line location. The number group translates the 12 code as an indication to the marker that the central programmed control unit must be used. The marker [than] *then* causes the number group connector switches leading to the number group to be opened, and additional switches leading to the marker bid scanner 5–2 and to a marker buffer translator 5–1 to be closed. The marker bid scanner 5–2, sensing the bid for service, initiates a request for service of the central programmed control unit via the data receiver translator 5–3, in a similar manner to that described earlier. The central programmed control unit connects an idle marker buffer translator 5–1 to the marker via the number group connector, at which time the 12 ABX XXXX code and calling subscriber's line location are transferred via the marker buffer translator 5–1 into the central programmed control unit.

The central programmed control unit stores the remote station number and calling line location in its line information store, then transmits the line location number of the calling line and the directory number of the remote station line via the marker buffer translator 5–1 into the marker. The marker, assuming that these digits came from the originating register in the normal manner, requests a translation of the line location of the remote station from the number group and completes the connection between the calling and the remote station line. The number group connector is then released by the marker, and the marker bid scanner 5–2 and marker buffer translator 5–1 are released, allowing the central programmed control unit to regain an idle status.

When the customer at the remote station answers the call, the calling subscriber can advise him that he should accept subsequent transferred calls. This act of initially calling the remote station allows verification that the proper directory code had been dialed.

If the remote station set is busy when the call is attempted, the calling subscriber may subsequently verify the transfer by dialing the 12 ABX XXXX digits repeatedly until he contacts a subscriber at the remote station. However, this procedure will not nullify or change the transfer information contained in the central programmed control unit line formation store. Calls can still be initiated from the transferring telephone station, while all incoming calls will be transferred to the remote station.

Subsequently, if the transferring subscriber wishes to cancel the transfer of incoming calls, he performs a procedure identical to that for initiating the call transfer service, but instead of dialing a remote station directory number, he dials the prefix code 12 followed by his own directory number. The central programmed control unit verifies in the line information store that the dialed XXXX digits correspond to his normally assigned number. The registration of the remote station number in the line information store is then canceled by the control unit acting to restore the binary digit reference in the subscriber's line location of the line information store, indicating that when subsequent incoming calls are to be completed, they should be completed to the original subscriber's line. The central programmed control unit then sends the line location number of the calling line and directory number of the called subscriber into the marker via the marker buffer translator 5–1. After translation of the directory number by the number group, the marker receives the line location of the directory number. Since the two locations are identical, and the calling subscriber is off hook and is the same subscriber as the called subscriber, the marker thereupon connects the calling subscriber's line to trunk which returns busy signal to the calling subscriber. This indicates to the calling subscriber that the remote station transfer registration has been canceled in the central programmed control unit.

An incoming call to a subscriber's line, which has utilized the transfer feature, may originate from any line associated with the common control system, a trunk from another telephone exchange, or from a remote switching unit associated with a line circuit connected to the common control system. The sequence of events involving a call from a trunk connected from another exchange will be described below. A call originating from a subscriber's line proceeds in a generally similar manner, as will be understood by one skilled in the art understanding this invention.

Figure 7:
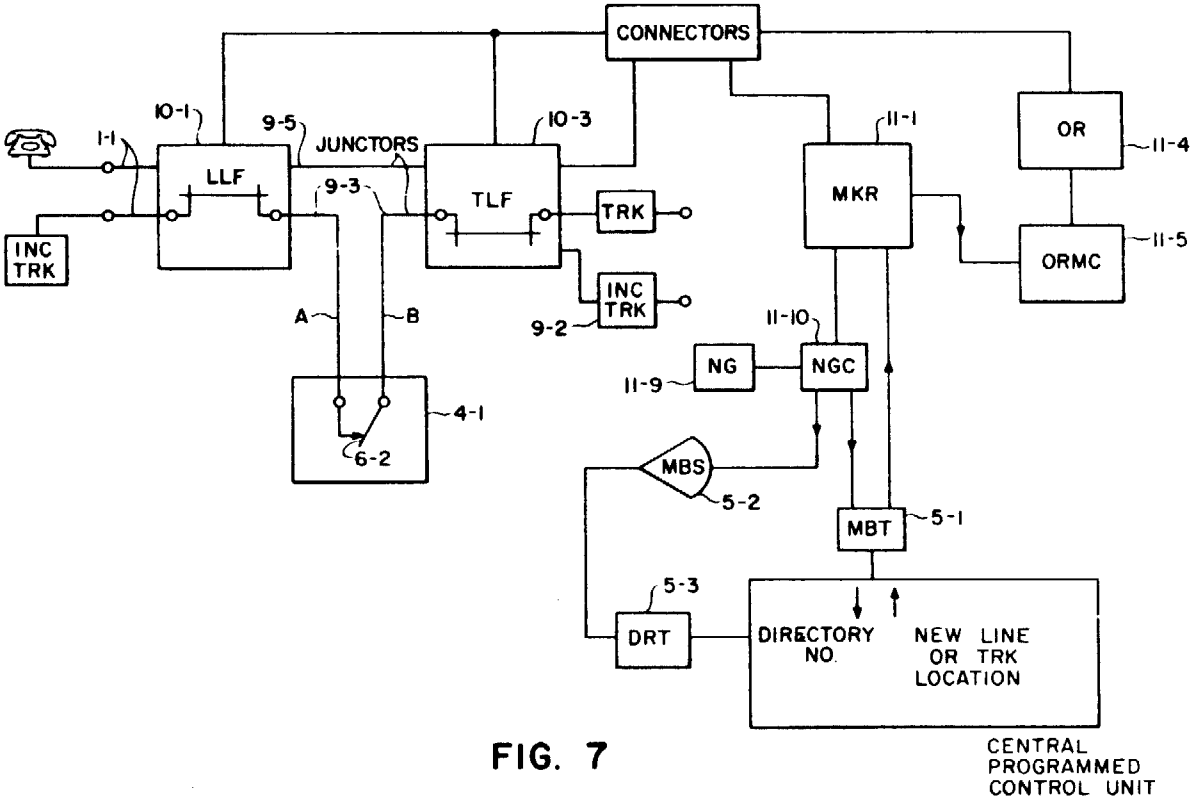
FIG. 7 is a block diagram of this invention showing only those system components necessary during a variable transfer type of call.

Referring to FIG. 7, assume that an incoming trunk 9–2 has been seized, and has transmitted the code digits ABX XXXX into an incoming register (not shown). The incoming register transfers the received digits to the marker, in a similar manner to an originating register during the initiation of a call, as is described in the aforementioned A. J. Busch patent. The marker is then connected to the number group via the number group connector in order to identify the ringing code of the called subscriber's line and its equipment location. The number group passes information to the marker that the called line is provided with variable transfer service, in the normal manner of identifying particular types of ringing code. In response to the signal that this ringing code, analogous to a pseudo class of service is to be extended, the marker causes the number group connector to be connected in a circuit path to the marker bid scanner 5–2.

The connection of the number group connector to the marker bid scanner appears thereto to be a bid for service. The scanner 5–2 identifies the particular number group connector by its location in its clock controlled time cycle. The data receiver translator 5–3 associated with the marker bid scanner 5–2 translates the bid for service and initiates action by the central programmed control unit. The central programmed control unit sets up a path to an idle marker buffer translator 5–1 connected to the number group connector which has bid for service.

The marker transmits the directory number and pseudo class of service of the called line through the number group connector into the marker buffer translator 5–1, which translates it into a form acceptable to the central programmed control unit. The central programmed control unit, having received the class of service information from the number group that the called line is a line which has a variable transfer feature, searches its memory and finds that the called subscriber has requested completion of the call to a designated remote station. In the manner described in the aforementioned Gebhardt et al. patent, the central programmed control unit effects the translation. The translated remote station directory number of the remote station is transmitted from the marker buffer translator 5–1, into the marker as if it had come from a register through a register marker connector. The number group is used again, and this time translates the remote station directory number into its corresponding line location designation, which is then transferred via the number group connector into the marker as if it had been the translated line location of the originally dialed number.

The marker, in receiving the called line location, proceeds to effect completion of the call in the normal manner. The number group connector is disconnected from the marker, thus dropping the bid for service by the marker bid scanner 5–2, and thus the remainder of the central programmed control unit is returned to an idle condition.

If the subscriber having the variable transfer feature had requested that the incoming calls be transferred to a remote station not terminated on his common control system, but to a remote telephone switching common control system, the translated line location from the central programmed control unit would provide the transferred line location to the marker in the normal manner. The marker, now noticing that the call is to be completed via an outgoing trunk to a remote switching office, for instance, possibly using a tandem switching office, will initiate completion of the call through the outgoing trunk as described in the aforementioned A. J. Busch patent.

2.3. Connection of a Remote Switching Unit

A remote switching unit can be a community switching office or PBX which homes on a large central switching office, usually via trunks terminated in line circuits of the central office. The central office is activated by signals transferred through the trunks; since the line circuits receive digit pulses from the trunks, the activation system is often called "line link pulsing." The central office is operated as if the call had originated from a subscriber's line circuit terminated on a line link frame. A subscriber terminated on the remote switching office, however, must wait until his initially dialed digits are pulsed a second time over the trunks into the central office if he wishes to communicate with a subscriber not directly connected to the remote switching office. Such a system is described in the aforementioned Gebhardt et al. patent.

Similarly, a subscriber whose line is terminated on a central switching office and wishes to communicate with a subscriber terminated on a remote switching unit such as that described in the Gebhardt et al. patent must dial the digits, then wait until the central switching office connects to the remote switching unit, whereupon the digits are again pulsed thereto over a trunk. Again, a delay in connection of the call is incurred.

In this invention, a transmission path may be set up to a remote switching unit from a line or trunk terminated on the central office and a called subscriber's line seized without the requirement of line link pulsing. In fact, the operation of the equipment appears to the calling subscriber to be similar to that which would be observed had the called subscriber's line been connected to the remote switching unit, rather than the common control switching system.] *been connected to the common controlled switching system rather than the remote switching unit.*

Figure 8:
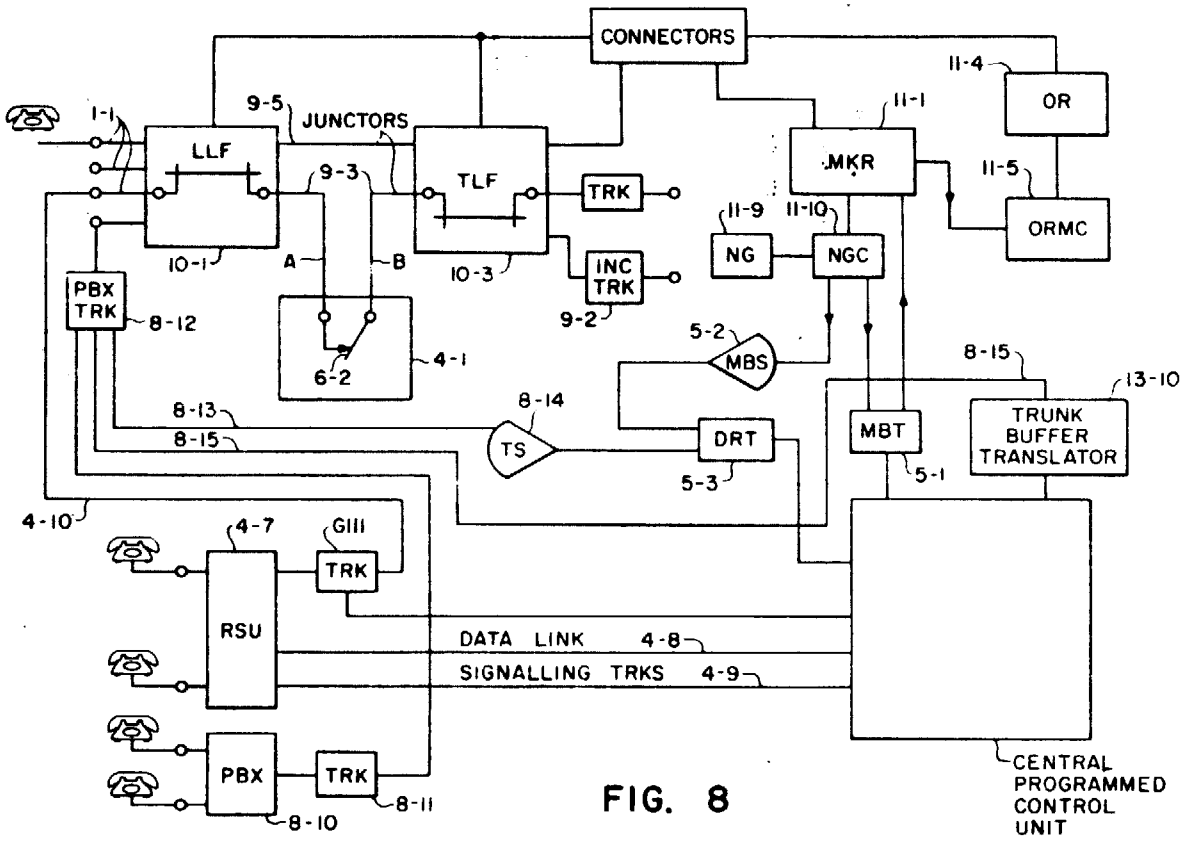
FIG. 8 is a block diagram of this invention showing only those system components necessary during connection to a subscriber at a Private Branch Exchange (PBX), and at a remote switching unit.

The general block diagram arrangement is shown in FIG. 8, with remote switching unit 4–7 (which may be a PBX) connected via central office trunk 4–10 to a line link frame of the common control system (shown as a single trunk path for sake of simplicity), and with data link 4–8, signalling trunk 4–9, and central office trunk control G111 similar to that described in the aforementioned Gebhardt et al. patent, connected to a central programmed control unit.

A call being received via an incoming trunk from another central office, which is intended to be connected to a subscriber's line terminated on a remote switching unit, will be described below.

When an incoming trunk is seized, an incoming register is connected thereto in the normal manner, as described in the aforementioned A. J. Busch patent. After the incoming register receives the called line directory number from the trunk, the incoming register marker connector connects the incoming register to the marker (see FIGS. 4 and 5), and the called line directory number digits are transferred thereto. The number group, via the number group connector, is then connected to the marker, and indicates to the marker the equipment location of the called line and its ringing code, as in the normal operation of the common control system.

The information containing the equipment location of the called line, and its ringing code, indicates to the marker that the called line appears at a remote switching unit, rather than directly on the line link frame of the common control system. The number group connector is then connected to the marker bid scanner 5–2 rather than to the number group, to permit a bid in the marker bid scanner for assistance by the central programmed control unit. The bid for service is translated by the data receiver translator 5–3 and as described earlier, the central programmed control unit causes connection of a marker buffer translator 5–1 to the number group connector which requested service.

The directory number information is then passed from the marker, through the number group connector and the marker buffer translator 5–1 to the central programmed control unit, indicating to it by the preliminary ABX central office number which remote switching unit the called station is terminated at.

The central programmed control unit then identifies an idle trunk 4–10 to the remote switching unit 4[–1]–7 which is terminated on the line link frame of the common control system. The trunk identification pseudo-directory number information is transferred into the marker via a marker buffer translator 5–1 as if it had come from a register. After receiving a translation to the trunk location on the line link frame of the pseudo-directory number form the number group, the marker then acts in a manner described in the A. J. Busch patent to connect the incoming trunk to the outgoing trunk on the line link frame.

In the meantime, in the manner described in the aforementioned Gebhardt et al. patent, the central programmed control unit alerts the remote switching unit 4–7 via a data link 4–8 that a particular central office trunk is to be connected to a particular called line in a similar manner as that for an incoming call to a PBX extension. Thus it may be seen that an incoming trunk to the common control system is connected by the common control system to a central office trunk 4–10 leading to the remote switching unit, using the stored information held in the central programmed control unit as to which central office trunk to the remote switching unit is to be used. In addition, within the remote switching unit, the called line is connected to the central office trunk, using the stored programmed control of the same central programmed control unit. Since the called line is selected and connected in the manner described in the aforementioned Gebhardt et al. patent using the data link 4–8 for control, there is no requirement for line link pulsing of the central office trunk. The key to the operation of the entire system in this manner is the shared utilization of the central programmed control unit by the remote switching unit and the common control of the common control system.

If, in the process of attempting to complete the call at the remote switching unit, the central programmed control unit determines that either the called station line or all trunks from the line link frames of the common control system to the particular remote switching unit are busy, the central office trunk is substituted by a predetermined type of busy signal source, either a "line busy" type of signal, or "all-paths busy" type of signal if all trunks to the remote switching unit are in use. A signal is thus returned to the calling subscriber indicating to him that his call could not be completed.

This invention can also be used for communication with conventional PBX's which are not intended to home on a central programmed control unit such as described in the Gebhardt et al. patent, and to eliminate relatively uneconomic line link pulsing. FIG. 8 shows the general arrangement of this type of PBX in the system of this invention.

A conventional PBX 8–10 is connected via its usual PBX trunk circuit 8–11 and 8–12 to a line circuit of the line link frame 10–1. Normally when a subscriber connected to the PBX 8–10 wishes to make a call, he dials 9, is connected to PBX trunk 8–11, and 8–12, and thus has access to a line circuit of the line link frame 10–1. A second dial tone is thus returned from the central common control switching office. He proceeds to dial his digits and is connected in the normal manner to a called subscriber.

According to this invention, however, the line link frame termination of the PBX trunk 8–12 contains a relay or similar means which affords a ground or bid for service over cable 8–13 when seized from the line link frame. Cable 8–13 is connected to the trunk scanner 8–14, and in conjunction with the data receiver translator 5–3 provides an indication to the central programmed control unit which PBX trunk has been seized. Instead of the trunk scanner 8–14 and data receiver translator 5–3, the marker bid scanner 5–2 and data receiver translator may be used with suitable data translation provisions.

When a call to be terminated at a subscriber's line or PBX 8–10 is being processed by the common control system, the dialed ABX XXXX subscriber's line directory number is recognized by the marker as being for the PBX 8–10, and the central programmed control unit is seized in a similar manner to that previously described. Receipt of the ABX XXXX code by the central programmed control unit causes it to identify a group of trunks, of which PBX trunk 8–12 may be a member, leading to the PBX for which the call is destined. Trunk scanner 8–14, meanwhile, maintains updated information of the status of all trunks to the PBX, whether idle or busy. If all PBX trunks in the particular wanted group are busy, the central programmed control unit returns the equipment number of an "all paths busy" type of tone trunk to the marker via the marker buffer translator 5–1. The marker completes the connection between the calling line or trunk and tone trunk, and returns to normal.

However, if there is an idle PBX trunk such as 8–12, the central programmed control unit obtains an identification of an idle trunk from the trunk scanner 8–14 and data receiver translator 5–3. An idle trunk buffer translator 13–10 (FIG. 13) is then connected to the trunk via a trunk buffer translator connector 13–11, and via cable 8–15. The trunk buffer translator 13–10 and trunk buffer translator connector 13–11 are similar to the marker buffer translator 5–1 and output signalling connector G510 to be described more fully below.

The directory number of the called subscriber's line at the PBX is passed into the trunk buffer translator 13–10 in binary code, is converted into code recognizable by the PBX, such as dial pulses. Thus the central programmed control unit substitutes effectively for a special sender previously required in the connection and pulsing of such PBX trunks to a common control system.

Meanwhile, the equipment number of the selected trunk is sent via the marker buffer translator back to the waiting marker. Upon receipt of this information the marker completes the call to the selected trunk which appears on the line link frame 10–1, and restores to normal.

When the trunk buffer translator is connected to the selected trunk, the trunk acts as if it has been seized by the common control system, and a bid for service is placed with the PBX 8–10 in the normal manner. Dial tone is thus returned by the PBX 8–10 to the trunk 8–11 and 8–12. The dial tone is sensed by the trunk buffer translator 13–10, and dial pulses corresponding to the directory number of the called subscriber are returned to the PBX. During these events, of course, trunk 8–12 cuts off connection to the line link frame so that a false busy indication is not provided. The PBX thus is caused to ring the called party. Once the trunk is seized from the central office line link frame, the trunk connection which was cut off is reconnected, completing a path from the called subscriber's line to the calling subscriber line. Ringing signals, busy signals and other supervisory signals may thus be sent back by the PBX to the calling subscriber.

After the marker has finished setting up the call, it returns to an idle condition in the normal manner. This causes the cessation of a bid for service of the central programmed control unit, effectively allowing it to return to an idle condition.

2.4. Dial Transfer

The special feature termed "dial transfer" allows a subscriber to transfer a call in progress from his line to a different subscriber's line. The subscriber depresses his hookswitch momentarily for instance, less than 1 second (often called a "flash"), whereupon dial tone is returned to his line. He then dials the directory number of a subscriber's line to which he wishes the call to be transferred, and after the connection is made he may hang up his handset, whereupon the distant subscriber's line is connected to the transferred-to subscriber's line.

Figure 9:
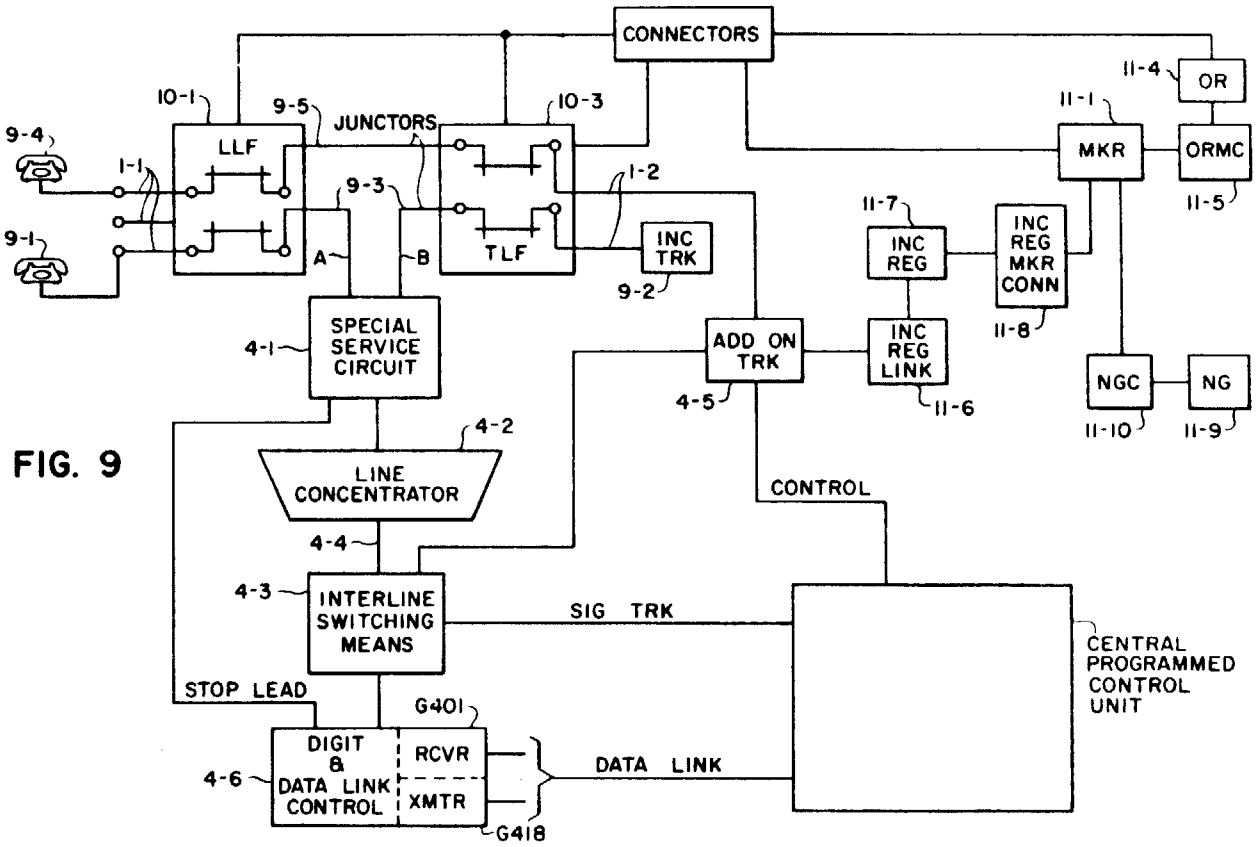
FIG. 9 is a block diagram of this invention showing only those system components necessary during a dial transfer type of call.
Figure 10:
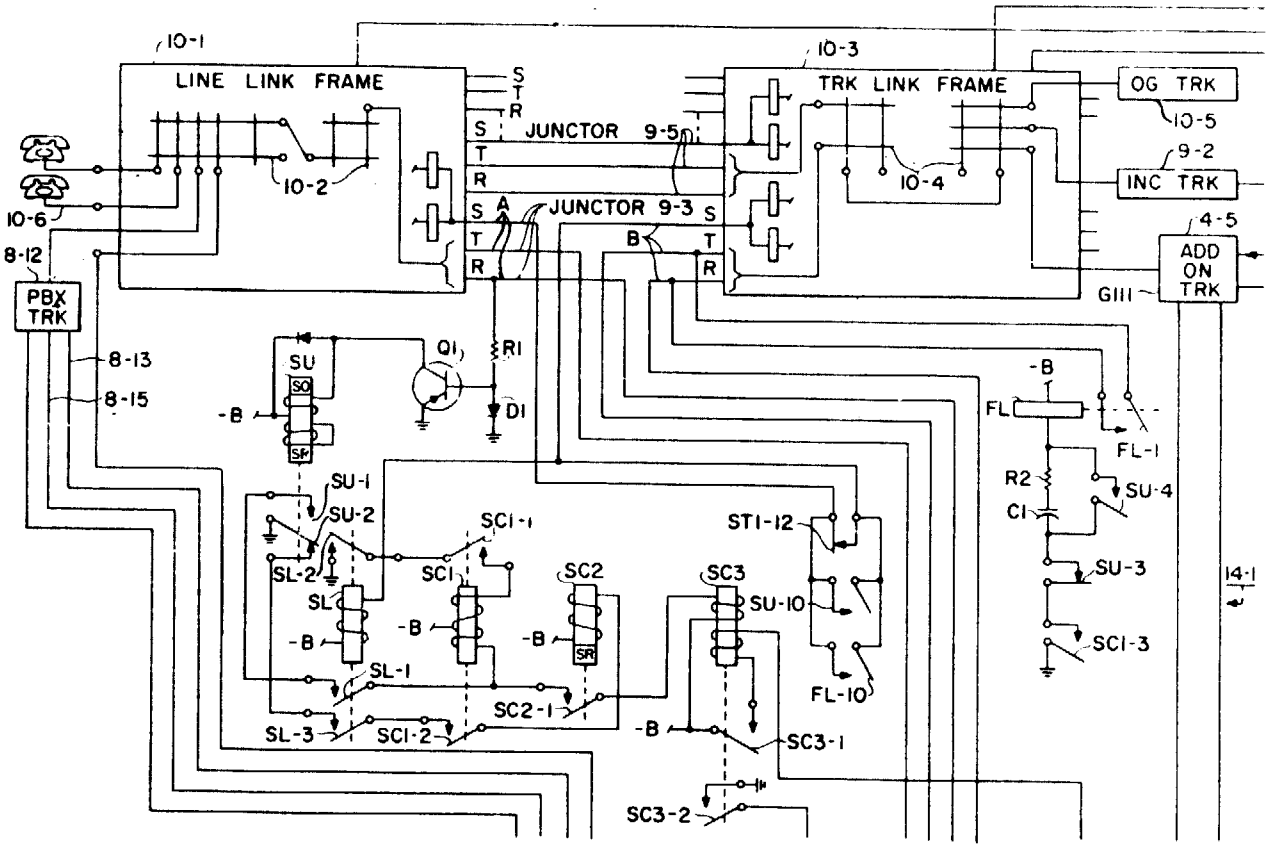
FIGS. 10, 11, 12, 13, 14, 15 and 16 are to be arranged in order to consider them as single unified drawing.

Referring to FIG. 9, let it be assumed that telephone set 9–1, connected to the line link frame of the common control switching system, is provided with dial transfer service, and is connected during a call to the incoming trunk 9–2 shown connected to the trunk link frame. Alternatively, for instance, it could have been connected to another telephone set on the same line link frame but in that case, as is usual in such common control systems, interconnection is made through an intraoffice trunk connected to the trunk link frame. Since telephone set 9–1 has provision for dial transfer, a special junctor 9–3 interconnecting the line link frame and the trunk link frame is preselected by the marker (indicated by a special service class mark in the number group), and is continuous through a special service circuit 4–1. Under usual circumstances, the special service circuit merely provides a continuous normal transmission path through to the trunk link frame, as is indicated by the normally closed switch 6–2 shown in FIGS. 6–8.

The PBX described in the aforemention Gebhardt et al. patent can be programmed to allow dial transfer between lines terminated on its switching unit under control of its central programmed control unit. The instant invention utilizes a small PBX-Type switching system such as the remote switching unit described in the Gebhardt et al. patent, to allow provision of a dial transfer feature to the large number of lines terminated on a common control system line link frame, by providing a special circuit which interfaces with line circuits 44 in the interline switching means 4–3 of the PBX. The relatively small capacity remote switching unit, however, is connected to junctors 9–3 and trunks 4–5 at the central office, rather than at a remote location. High efficiency of utilization is obtained since a small number of dial transfer calls relative to the total number of normal calls allows condensation of special service traffic through a line concentrator 4–2.

Thus the special service circuits are interconnected with the interline switching means 4–3 of the remote switching unit through a line concentrator 4–2.

Assume now that station set 9–1 is interconnected to an incoming trunk 9–2 through junctor 9–3 which also is connected through a special service circuit 4–1. When the first subscriber at station set 9–1 wishes to transfer the call to a remote station set such as 9–4, he flashes his hookswitch. A special service circuit 4–1 is thus alerted, which splits the junctor into the two parts. The first subscriber's portion A of the junctor 9–3 is terminated in one line circuit of the interline switching means, and the trunk portion B of the junctor 9–3 is terminated in another line circuit of the interline switching means.

The central programmed control unit detects the effective "off hook" conditions at two line input circuits 4—4 and through identification of the particular interline switching means 4–3, institutes a special "dial transfer" program. An add-on trunk 4–5 terminating on the interline switching means is assigned to the call. Dial tone is then returned to the line circuit 4—4 terminating the first subscriber's line, which becomes audible to the first subscriber via the junctor 9–3, part A.

The subscriber thereupon dials the directory number of the subscriber's line to which he wishes his end of the call transferred. After receiving this number the central programmed control unit causes a connection to be made in the interline switching means 4–3 between the line circuit 4—4 in which the subscribed end A of junctor 9–3 is terminated, and an idle add-on trunk 4–5, and holds another connection between the line termination in the interline switching means connected to the trunk portion B of junctor 9–3 and the add-on trunk 4–5. Since the two connections from parts A and B of the junctor 9–3 are connected to the trunk 4–5 in different time slots, they are not connected together. The central programmed control unit through a control lead to the add-on trunk causes it to be seized, whereupon an indication is given to the marker in the normal manner that an incoming register INC REG should be connected to that trunk, as if it were a seized incoming trunk. The marker then connects [an incoming register through] an incoming register through an incoming register link INC REG LINK to the trunk. The central programmed control unit then sends the directory number of the subscriber's line to which the call is to be transferred into the incoming register via the add-on trunk, which registers it similar to the way had the number been received over an incoming trunk from a remote office, as described in the A. J. Busch patent.

The incoming register then requests the service of a marker in the normal manner which interconnects the add-on trunk through the trunk link frame and line link frame via normal junctor 9–5 to the remote subscriber's line. A second subscriber may thus release the hookswitch at his station set 9–4 and thus have a transmission path through the line link frame, junctor 9–5, trunk link frame, add-on trunk, interline switching means 4–3, line concentrator 4–2, special service circuit 4–1, the first subscriber's portion A of the junctor 9–3, the line link frame, the first subscriber's line, and station set 9–1.

If the station set 9–4 is busy, busy tones is applied to junctor 9–5 in the normal manner and is returned via the add-on trunk 4–5 to the first subscriber. The memory in the central programmed control unit indicates that "answer" supervision has not been received from the add-on trunk. After a predetermined time interval, the add-on trunk is released, under control of the central programmed control unit, causing the interline switching means 4–3 to release the interconnection between the line circuit 4—4 connected to the first subscriber's portion A of junctor 9–3 and the line circuit connected to the add-on trunk 4–5 and also the connection to junctor 9–3, portion B, connected to the trunk link frame. The special service circuit 4–1 is thereby released, restoring the original non-special transmission path joining the two portion A and B of junctor 9–3. There is now a through connection between the first subscriber's station set 9–1 and the incoming trunk 9–2.

Instead of waiting for the busy signal to time-out, the subscriber can send a second hookswitch "flash," which directs to the central programmed control unit to immediately restore the conditions identical to those after the "time-out" period.

If the remote station set 9–4 is being rung, but no one is present to answer, or the calling subscriber changes his mind and wishes to terminate ringing, he may "flash" his hookswitch or he can wait a timing-out period as described above with respect to a busy condition.

When the subscriber at the remote station set 9–4 answers, supervision is received in the central programmed control unit from the add-on trunk which causes it to change the status record in its memory to indicate that the call has been answered. Under this condition, junctor 9–3 is split but junctor 9–5 is normal. The transmission path between the line circuit 4—4 in the interline switching means connected to a calling subscriber portion A of junctor 9–3 is connected to the line circuit in the interline switching means connected to the add-on trunk. However, there is now no transmission path between the line circuit 4—4 in the interline swtiching means connected to the B portion of junctor 9–3 and the line circuit 4—4 connected to the A portion of junctor 9–3. Therefore, the first subscriber and the subscriber at the transferred-to set may carry on a consulting conversation without being heard by the distant customer whose connection is being held on the incoming trunk portion of junctor 9–3.

After consultation the first subscriber establishes a three way connection in the interline switching means by flashing his hookswitch. This signal is received in the interline switching means, and after translation is sent via digit and data link control 4–6 over the data link to the central programmed control unit. The central programmed control unit then transmits the proper instruction to the interline switching means to cause it to close the transmission paths between the line circuit leading to the add-on trunk 4–5 and the previously established transmission links to the two line circuits leading to the two sections A and B of junctor 9–3. A three way conference condition is thereby established temporarily after which the first subscriber hangs up his handset and opens his hookswitch, thus disconnecting from the connection.

The disconnect signal is passed into the interline switching means 4–3 via the line circuit 4—4 terminating the first subscriber's portion A of junctor 9–3. This is passed over the data link to the central programmed control unit, which translates it and instructs the interline switching means 4–3 to replace the line circuit connected to the subscriber's portion A of junctor 9–3 by a connection to the line circuit connected to the portion B of the junctor 9–3 leading to the incoming trunk, and to release the interline switching means transmission link used to associate the line circuit on which the incoming trunk portion B of junctor 9–3 was connected to the add-on trunk 4–5. The line link frame connections to station set 9–1 thus are released, and further calls may be made from and to station set 9–1.

In this manner, the incoming trunk is connected to the add-on trunk and thus the remote station subscriber via portion B of junctor 9–3, the special service circuit 4–1, a line concentrator unit 4–2, and an interline switching means 4–3.

At the end of the call, a disconnect signal is received in the interline switching means 4–3 where it is detected sent over a data link to the central programmed control unit, and translated. The central programmed control unit then sends instructions over the data link to the digit and data link control 4–6 to cause release of the special service circuit, which restores junctor 9–3 to an idle condition, and thus also opens all circuits between junctor 9–3 and the interline switching means 4–3. Concurrently, the central programmed control units sends a signal via its control leads to the add-on trunk, cause it to release. The system is thus restored to an idle condition.

2.5. Add-on

The special feature of add-on enables a subscriber who is carrying on a conversation to add a third subscriber to the conversation by flashing his hookswitch and dialing the third subscriber's directory number.

The equipment arrangement is similar to that described for dial transfer, and may be understood by reference to the block diagram shown in FIG. 9. The sequence of events is similar to that described above relating to dial transfer to the point where all three subscribers are connected by the three way transmission link in the interline switching means. However, at this point the first subscriber does not replace his handset on the hookswitch, but simply carries on a conversation in the normal manner. In this case, the transferred-to subscriber may be called the added subscriber.

However, from a service standpoint the function may differ from dial transfer in the order in which the first and added subscribers terminate their communication with the remote subscriber. When the added subscriber disconnects his hookswitch under either of the aforementioned cases, the central programmed control unit identifies the disconnect signal as coming from the incoming trunk portion of junctor A terminating on a line circuit in the interline switching means. Reference to its memory indicating the status of the connection enables the central programmed control unit to send the proper instructions over the data link, via the digit and data link control 4–6 to the interline switching means 4—4 and thus prevent the input trunk portion B of junctor 9–3 to be released and therefore junctor 9–3 be restored to normal. Junctor 9–5 is also released after a signal is sent from the central programmed control unit over its control lead to the add-on trunk, releasing it, causing release of the junctor.

2.6 Conference Connections

The combination of features described above with respect to dial transfer and add-on permit more than two local subscriber's lines which are designated as having special service features, and terminated on the common control system, to be connected together with a third station terminated on the common control system and connected to either an incoming or outgoing trunk. By means of the program stored in the central programmed control unit, it may be seen by those understanding this invention and the aforementioned Gebhardt patent that either the called station or any of those added-on to the connection will be permitted to add others to a conference condition, with the exception of the distant station terminated on an incoming or outgoing trunk.

For transmission reasons it may be desirable to arrange the program stored in the central programmed control unit memory to provide a limit of, for instance, four local stations taking part in the conference from being exceeded.

3. DETAILED DESCRIPTION

The invention in its most detailed form is shown in FIGS. 10 to 16 (assembled according to FIG. 3) in schematic and partially block diagram representation. Since common control in general and the specific common control system described as an example herein is well known in the art, only those portions which pertain directly to this invention will be described in detail.

As mentioned above, the electromechanical common control system described herein by way of example is fully discussed in the aforementioned A. J. Busch patent, the block diagram being shown in FIGS. 235 and 236 thereof. The reader is referred to that patent for an explanation of that invention. Corresponding to those FIGS. 10 and 11 of this application shows a representative line link frame 10-1 comprising line switches 10-2, interconnected to a representative trunk link frame 10-3 containing trunk switches 10-4 by means of junctors, such as junctor 9-5. Special junctors such as junctor 9-3 will be described more fully below. An outgoing trunk 10-5 may be connected to trunk switches of the trunk link frame 10-3, as may be incoming trunks such as incoming trunk 9-2. Add-on trunk 4-5 which is also connected to trunk switches in the trunk link frame will be further described below.

A representative dial tone and completing marker 11-1 is shown, which connects to the line link frame 10-1 via a representative line link connector and line link marker connector 11-2, and to the trunk link frame 10-3 via a representative trunk link connector and trunk link marker connector 11-3. An originating register 11-4 is also connected to the trunk link frame 10-3, and to the marker 11-1 via an originating register marker connector 11-5. Similarly, an incoming register link 11-6 connects a representative incoming register 11-7 to the incoming trunk 9-2, and to the marker 11-1 via an incoming register marker connector 11-8. A number group 11-9 is connected to the marker through a number group connector 11-10.

All the elements discussed in the block form above have well-known functions both in the system described in the aforementioned A. J. Busch patent, and individually, but are shown representatively since they figure in the general operation of this invention.

Normally, upon receipt of an indication as to the availability of the dialed directory number digits, as well as the calling line location and its class of service, from the originating register 11-4 or incoming register 11-7 via a register marker connector 11-5 or 11-8, the marker requests service of a number group 11-9 for translation of the directory number to a line location. Contacts groups such as representative contact 11—11 in the number group connector connect a directory number memory in the marker 11-1 to translation crossconnection arrays in the number group 11-9, and back to a line or trunk location memory in the marker, as is well described in the aforementioned A. J. Busch patent. It should be recognized that under the commonly used seven-digit subscriber numbering scheme, the designation is prepared to store and request translation of seven-digit directory numbers, four-digit directory numbers (whereof the central office directory designation has been removed) 10-digit directory numbers (which contains a remote area three-digit code), 11-digit directory numbers (which further contains a digit designating that the call is to be routed to a remote area), four-digit special service calls, one digit operator calls, etc. From the translated line location, a ringing code class of service indication is transmitted by the number group to the marker indicating preference connection, special ringing, etc. Thus it may be seen that the marker contains the inherent capability of discriminating between different "types" of digit series in addition to different digit series per se, and of acting in a particular manner according to the type of digit series.

There are generally two different types of digit series which must be acted on by the marker in a slightly different fashion from the above, but within its inherent capability. The first digit series corresponds to a directory number dialed to designate a subscriber's line which has one or more types of the special features described earlier herein. The directory number is stored in the marker 11-1 in the normal manner and after the closure of a switch 11—11 in the number group connector 11-10, number group effects translation of the directory number. However, the number group now designates that the line location corresponding to the directory number contains a predetermined special service classification, and transmits this information to the marker. The marker line location memory then disregards the translated line location and in response to the special classification mark in accordance with principle of design well known in the art, closes new representative bid for service contact 11-12 in the number group connector 11-10 which in effect requests assistance by the central programmed control unit. Representative contact 11-13 in the number group connector 11-10 also closes, connecting a bus from the directory number memory through the marker from the originating register to the central programmed control unit.

The second type of digit series contains a predetermined prefix such as 11, or 12, which indicates to the marker that instead of contacts 11—11, contacts 11-12 and 11-13 in the number group connector 11-10 should be closed if the calling line is provided with the proper class of service, thus requesting a bid for service and preparing a bus path for transfer of directory digits, to the central programmed control unit.

Cable 11-14, connected through representative switch 11-12 is also connected to the marker bid scanner 5-2, which requests service of the central programmed control unit. Bus 11-15 is connected between switch 11-13 and the central programmed control unit, and transfers directory number digits and calling line location information to the central programmed control unit from the directory number memory in the originating register through the marker. Bus 11-16 returns translated directory number digits and calling line location information to the marker 11-1 from the central programmed control unit as if it had come from the originating register. Translation of the new directory number to its line location may then be done in the normal manner by the marker 11-1 via the number group 11-9 and contacts 11—11 in the number group connector 11-10.

The central programmed control unit consists generally of the structure contained in FIGS. 5 to 12 of the aforementioned Gebhardt et al. patent. Generally, it consists of programmed control logic, and a call status store which is a temporary memory keeping track of the various progression of stages of action in the call sequence, a line and trunk information store, which is a semipermanent memory keeping track of the various supervisory status of the line and trunks of interest, and a program store or action translator, which is a semipermanent memory containing the programming for general operation of the central programmed control unit.

Control elements within this central programmed control unit are used to operate various connectors which connect one or more marker buffer translators to number group connectors as well as certain types of trunks as required.

As described above, a well known scanner such as marker bid scanner 5-2, which may be comprised of elements contained in scanner G416 of the aforementioned Gebhardt et al. patent, operated synchronously, is connected to switch 11-12, in the number group connector 11-10. There of course can be other number group connectors connected to the marker register scanner. However, in this application lines interconnecting most of the blocks shown are intended to represent transmission paths and are therefore multiconductor cable or buses. Consequently, the transmission paths leading into the marker bid scanner in fact represent a multiplicity of bid wires which are each scanned sequentially in a predetermined time slot. Connected to the marker bid scanner 5-2 is a data receiver translator 5-3 which recognizes the particular time slot as being associated with a particular piece of equipment. The data receiver translator is designed, similar to data receiver G602, to provide an output signal consisting of 9 bits. The first bit indicates a request for service, the next 8 bits identify the particular piece of equipment requesting service, the next bit indicates the supervisory status of the piece of equipment bidding for service, and the tenth bit is a one or 0 parity bit. The output signal, being of the same form derived from the data receiver G602 is fed into a series of logic gates similar to G614, etc. (see FIG. 14) and is eventually fed into OR gate 1003. Similarly, data receivers G602 and G1000 are connected via associated logic gates into OR gate G1003. Data transmitters G618 etc., are operated from their own respective logic gates from a bus system and AND gate G1011. Therefore, it may be seen that any one data receiver or data receiver translator may actuate OR gate G1003 and thus bid for service at any one time.

A transmission bus 11–15 interconnects the number group connector 11–10 with a signalling connector G509. Switch 11–13 of the number group connector facilitates dumping directory number and call subscriber location digits from the market into the bus 11–15 at the proper time. The signalling connector G509 similar to that described in the aforementioned Gebhardt et al. patent interconnects signal receivers such as G501 (FIG. 13) with certain signalling trunks. However, in this invention, under control of network control G511, the signalling connector G509 also interconnects the signalling bus transmitting the aforementioned digits, from the number group connector (and marker) to a marker buffer translator 5–1. The signalling connector G509 can be one or a number of crossbar switches or other connection means as described in the aforementioned Gebhardt et al. patent. The interconnection cables for the specific equipment described herein so far between the marker and marker buffer translator may be cable for two-fifths direct current signalling plus a single "mark" wire. Thus it may be seen that each crosspoint in the signalling connector should be, using this particular equipment, six conductor.

The marker buffer translator 5–1, upon being connected to the signalling connector G509, in response provides a pulse, ground, or other such mark on the "mark" wire which indicates to the number group connector 11–10 to close switch 11–13. Digits held in the marker directory number, etc. memory may thereby be dumped in two-fifths code into the cable 11–15, and via signalling connector G509 into the marker buffer translator 5–1.

The marker buffer translator thereafter processes the digits in a manner similar to the signalling receiver G501 in its interface with the central programmed control unit. As may be seen, in addition to signalling receiver G501 being connected through AND gate G505 into OR gate G507, similar output circuitry in the marker buffer translator 5–1 is connected through AND gate G506 into OR gate G507.

For use with the second embodiment of this invention, signalling connector G509 also provides interface with a signalling receiver G501, which will be described in more detail later. The signalling connector G509 thus also provides an input termination for other signalling trunks which may be provided.

The marker buffer translator 5–1 translates the two-fifths code into binary acceptable by the central programmed control unit. Output terminals 1, 3, 4, and 7 of the marker buffer translator 5–1 provide a binary translator output of the digits received from bus 11–15 which is connected to the signalling connector G509. The binary translated digits are fed into the central programmed control unit through AND gate G524, OR gate G525, and then via bus G526, into progress mark translator G1100.

The output bus from OR gate G507 is interconnected in the normal manner as described in the aforementioned Gebhardt et al. patent with translators G904, G905, and G906. The output buses from these translators provide information to the progress mark translator G1100 on four leads TG1, TG2, TG3, and ATT. However, in this invention a new cable labeled SS is connected into OR gate G908, and then via bus G916 into the progress marker translator G1100.

Translated digit information, after processing in the program control logic in a similar manner to that described in the Gebhardt et al. patent, is transferred via translator G528 (FIG. 15) and bus G514 into the marker buffer translator 5–1.

An output connector G510 has its output levels operated similarly to those of the input levels of the signalling connector G509. However, the input levels of the output connector G510 are connected to an output of signalling receiver G501 and the marker buffer translator 5–1.

The bus 11–16 leading from the marker buffer translator 5–1 to the output connector G510 is similar to that connected to the input thereof, i.e. carrying two-fifths DC and a "mark" wire. The marker buffer translator 5–1 thus translates binary into two-fifths type DC code required for utilization by the marker.

An indication of interconnection by the output connector G510 allows a "mark" indication to be placed on the mark wire for transmission to the marker readying it for reception of the translated digits. At this point, the translated digits are dumped into the marker over bus 11–16 from the marker buffer translator 5–1 through output connector G510, as if they had originated from the originating register.

The second embodiment of this invention includes means for providing additional special services using the programmed applique to a common control switching system. This allows the provision of such features as dial transfer, add-on, conference calls, etc.

In addition to the combination described with respect to the first embodiment, data receivers and data transmitters such as G602 and G618 are used, along with a PBX (herein referred to as a small switching system) similar to that shown in FIGS. 3 and 4 of the aforementioned Gebhardt patent and described fully therein. As previously described with respect to FIG. 4 of this specification, the small switching system comprises an interline switching means 4–3, similar to that shown in FIG. 3 of the aforementioned Gebhardt et al. patent, and digit and data link control means with the appropriate receivers and transmitters as shown in FIG. 4 thereof. The line circuits 4—4 in this invention however, are not intended to be terminated directly to PBX extensions. They connect through a line concentrator 4–2, such as the one earlier mentioned, to special service circuits 4–1 which are connected to certain junctors of the common control system interconnecting line link frame 10–1 and trunk link frame 10–3.

Figure 12:
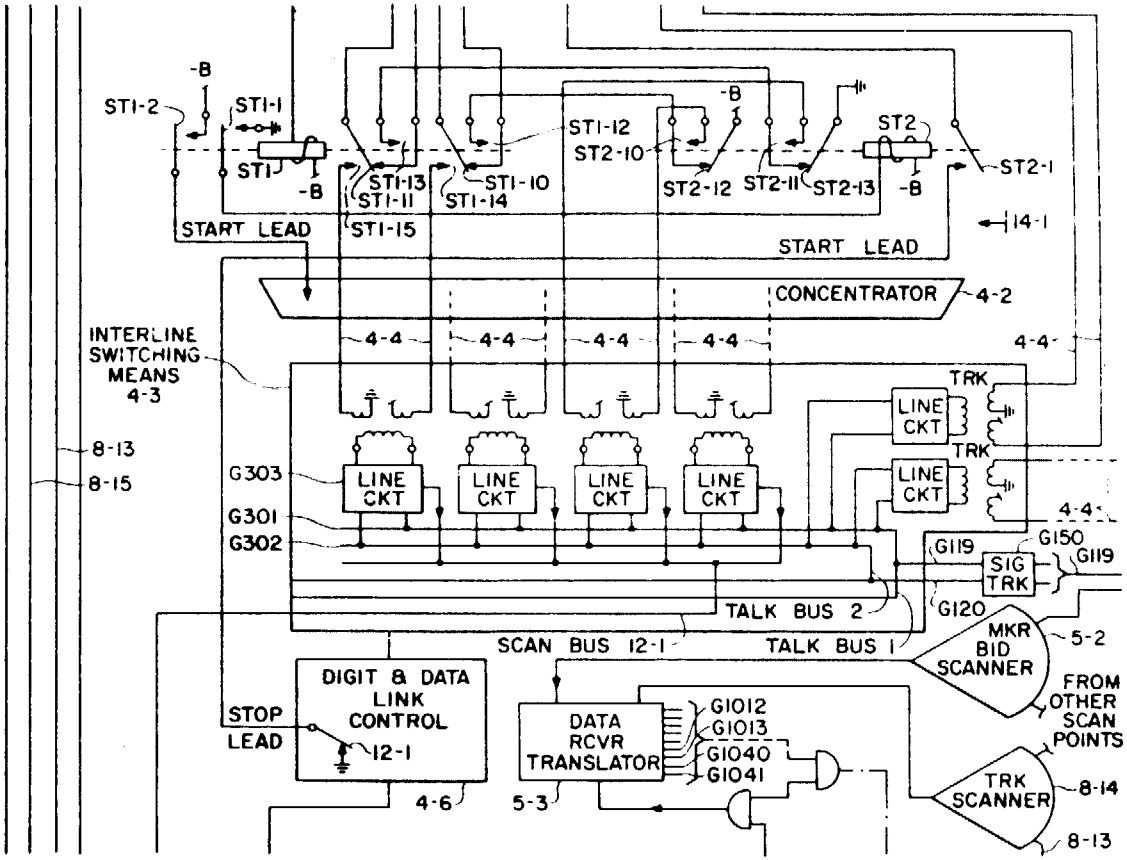

Shown in FIG. 12 of this specification is an interline switching means 4–3 containing representative line circuit G303. The line circuits are terminated on talk buses G301 and G302 and representative scan bus 12–1 terminated in a representative scanner G416. A digit and data link control 4–6, which controls operation of the interline switching means 4–3, as well as scanner G416, terminate in data receivers such as G401 and transmitters such as G618 as shown, in order to communicate via trunks G121 and G122 to data transmitters such as G618 and receivers such as G602. The operation of the aforementioned elements are well described in the Gebhardt et al. patent, and as their interrelationship forms only a component of this specific invention, the reader is referred thereto for a description.

The line circuit G303 terminations 4—4 which are intended to be connected to PBX extension lines are thus available for interface connections with the common control system as will be described below.

Certain junctors, such as junctor 9–3 are split and interconnected with special service circuits as described below. Depending on the economics and traffic experienced by the system operation company, it can either choose to terminate all lines requiring use of the special junctor on a predetermined line link frame or frames which contain the special junctors, or the marker can direct completion of all originating calls from subscriber lines having the special service through only certain groups of junctors which contain the special service circuits and which are distributed among all the line link frames according to traffic.

The junctors 9–3 to be modified contain tip (T), ring (R), and sleeve (S) conductors, and should be of the type which carries no reverse battery supervision. Customer lines which are to be connected through the modified junctors must be of the type which are only rung from the tip conductors. Customers who subscribe to both abbreviated dialing and dial transfer services are required to dial the full number of the wanted station rather than the abbreviated code of that station whenever they wish to perform the dial transfer, add-on, or conference operations described below.

The modified junctor 9–3 generally consists of a tip (T), a ring (R), and a sleeve (S) lead connected between the line link frame 10–1 and trunk link frame 10–3. The tip and ring leads are connected through break contacts ST1–10 and ST1–11 of an ST1 relay and the sleeve lead is continuous through a break contact ST1–12, made contact SU–1Q, and FL–10 (all in parallel) of the SU and FL relays. Make contacts ST1–12 and ST1–13 of the ST1 relay are connected in a transmission path from the trunk link frame portion B of the junctor tip and ring leads to a line circuit 4–4 of the interline switching means 4–3, and other made contacts ST1–14 and ST1–15 of the ST1 relay are connected in a transmission path from the line link frame portion A of the junctor tip and ring leads to another line circuit 4–4 of the interline switching means 4–3. Contacts ST1–10 and ST1–11 divide the junctor into the A and B portions.

The transmission path from both the tip and ring leads of the junctor connected to the trunk link frame are continuous through a pair of make contacts ST2–10 and ST2–11 of an ST2 relay as shown. A pair of break contacts ST1–12 and ST1–13 of the ST2 relay are connected between the junctor of the ST1 and ST2 made contacts and ground. Thus it may be seen that when relay ST1 is operated, the tip and ring lead of portions B of junctor 9–3 connected to the trunk link frame are connected to ground and negative battery respectively through the unoperated break contacts ST2–12 and ST2–13 of the ST2 relay, or to a line circuit 4–4 of the interline switching means 4–3 through the make contacts ST2–10 and ST2–11 of relay ST2 when the ST2 relay is operated. Battery and ground are extended to the ring and tip leads respectively of the junctor portion B connected to the trunk link frame from the other circuit 4–4 of the interline switching means 4–3. Ground and battery are extended to the ring and tip leads respectively of the junctor portion A connected to the line link frame from the line circuit 4–4 of the interline switching means 4–3. With this structure, whether the junctor is split via relays ST1 and ST2, or whether only ST1 is operated prior to the operation of relay ST2, the trunk circuits connected to the trunk link frame 10–3, which depend on the availability of battery and ground on the tip and ring leads of the junctor 9–3, are held operated.

The circuit which operates the ST1 and ST2 relay is constructed so as not to be affected by ringing current which may be present on junctor 9–3 from other circuits, or from dial pulses or tones which may be generated at the subscriber's station set. It also controls operation of the ST1 and ST2 relays in order to permit subscriber dial pulses, flash signals, and tones to reach the line circuit 4–4 of the interline switching means during required sequences of operation involved in the special types of calls described herein.

An SU relay, specifically chosen to have slow operate and slow release characteristics so as not to be operated by dial pulses and ringing current, yet respond to subscriber "flash" signals, is connected to the ring lead of junctor 9–3 at a point on portion A of the junctor connected to the line link frame, through a transistor circuit.

A SL relay is connected to the sleeve lead on portion B of the junctor connected to the trunk link frame, and is operated whenever the junctor is seized and held by a trunk connected to the trunk link frame. Make contacts SU–1 and SL–1 of the SU and SL relays are connected in series between ground and a first of two operation coils of an SC1 relay. Make contacts SL–2 and SC1–1 of the SL and SC1 relays are connected in series between ground and the second operation coil of the SC1 relay. The other ends of the two operation coils of the SC1 relay are connected to a battery supply —B.

Break contact SU–2 and make contacts SL–3 and SC–2 of the SU, SL and SC1 relays are connected between ground and the operation coil of a slow release type SC2 relay. The other end of the operation coil is connected to a battery supply —B.

Make contacts SU–1 and SL–1 are also connected in series with a make contact SC2–1 of the SC2 relay to the first of two operation coils of an SC3 relay. The second operation coil is connected through series connected make contacts SC3–1 and ST2–1 of relays SC3 and ST2 to a normally grounded digit and data link control 4–6 stop lead. (The ground connection is broken when the special service circuit is to be returned to normal.) The other ends of the SC3 relay coils are connected to a battery supply —B.

An ST1 relay is connected from a battery supply —B, through make contact SC3–2 to ground. Similarly, the ST2 relay is connected from a battery supply —B, through make contact ST1–1 to ground.

Transistor Q1, having base, collector and emitter electrodes, has its base electrode connected through current limiting resistor R1 to the tip lead at portion A of the junctor 9–3. Diode D1, is connected between the base electrode and ground as shown. The emitter is connected to ground and the collector is connected through the coil of the SU relay to a battery supply —B. Since ground is normaly present on the tip lead when that subscriber's loop is open, the transistor Q will be inoperative, but when the subscriber's loop is closed, such as when a subscriber's station set is off-hook the tip lead achieves a potential normally of approximately —24 volts, the transistor Q1 emitter base circuit is forward biased and the emitter-collector circuit will conduct, energizing the SU relay. Yet when ringing current or dial pulses are present, any ground currents which may be present on the tip lead are either due to positive potential, and bypassed around the base-emitter circuit of Q1 via diode D1 (while avoiding the introduction of an additional ground loop, due to the presence of high series resistance R1), or negative potential, and does not cause relay SU to operate due to its slow operate characteristics and the relatively high frequency of the dial pulses or ringing current.

An FL relay is connected through an RC timing circuit R2–C1 which has a charging time constant greater than the time expected for the longest expected flash (for instance 1.5 seconds), and a break contact SU–3 of the SC1 relay to ground. The FL relay coil is also connected to a battery supply —B, as shown. A make contact FL–1 of the FL relay is connected across the tip and ring leads of portion A of junctor 9–3. Line concentrator 4–2, through which all split junctors pass when being connected to line circuits 4–4 of the interline switching means 4–3 is started via a ground lead connected through make contact ST1–2 of the ST1 relay.

The battery supplies generally shown as —B are preferably —48 volts to conform with normal telephone office practice and with the particular switching systems used as component systems in this invention.

A well known line concentrator such as the one earlier mentioned interconnecting the special service circuits and line circuits of the interline switching means, provides traffic and capacity matching between the usually relatively large number of junctors in the common control switching system which contain the special service circuits 14–1, and the usually relatively small number of line circuit 4–4 available on the interline switching means.

It may thus be seen that there are two levels of traffic efficiency matching levels. At the first level, there are the usual number of subscriber's lines terminated on the line link frames of the common control switching system. A fraction of these lines normally require and are provided with, the specially modified junctors 9–3. The number of junctors provided with the special service circuits will depend on the density of special service traffic from circuits of the line link frame to circuits in the trunk line link frame, and is related to the dispersion of the subscriber's lines which have the special service options. Hence, since the number of special junctors 9–3 need only be according to their traffic usage and not according to the total number of subscriber's lines having the special service options, a first level of economy in provision of numbers of the special junctors is afforded.

However, of those subscribers having the facility, only a fraction thereof within a certain group, will in fact be using them at any particular time. Consequently, a line concentrator 4–2 is connected between the special service circuits 4–1 and line circuits 4–4 of the interline switching means 4–3. Hence the interline switching means may be used with great efficiency with respect to traffic due to the line conversion provided by the line concentrator. Needless to say, if the traffic in the common control office changes, the ratio of input lines to output lines in the concentrator may change, and, in fact, additional similar small PBX type switching systems to the one described may be connected to the central programmed control unit. In fact, as is described below, a remote centrex office or community switching unit may be connected in a similar manner, utilizing the central programmed control unit, but will not require line link pulsing for operation in conjunction with the common control system for, at least, calls to the remote centrex office.

Figure 11:
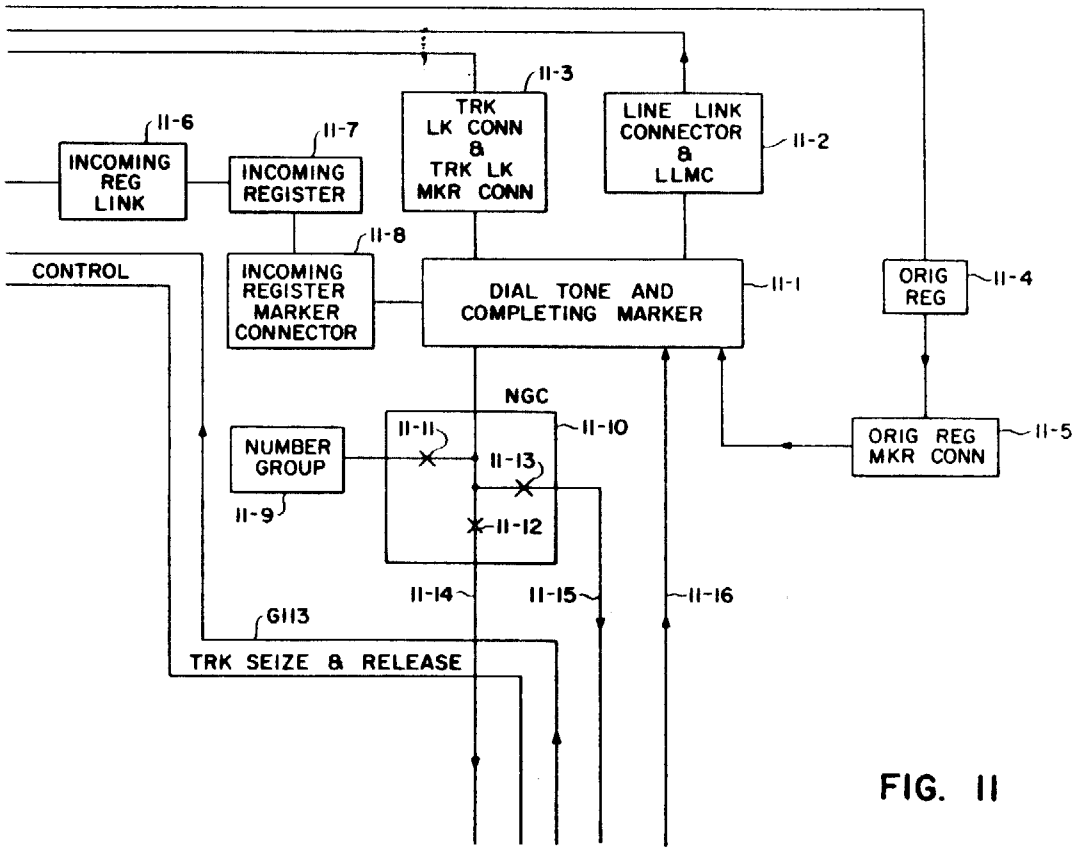
Figure 13:
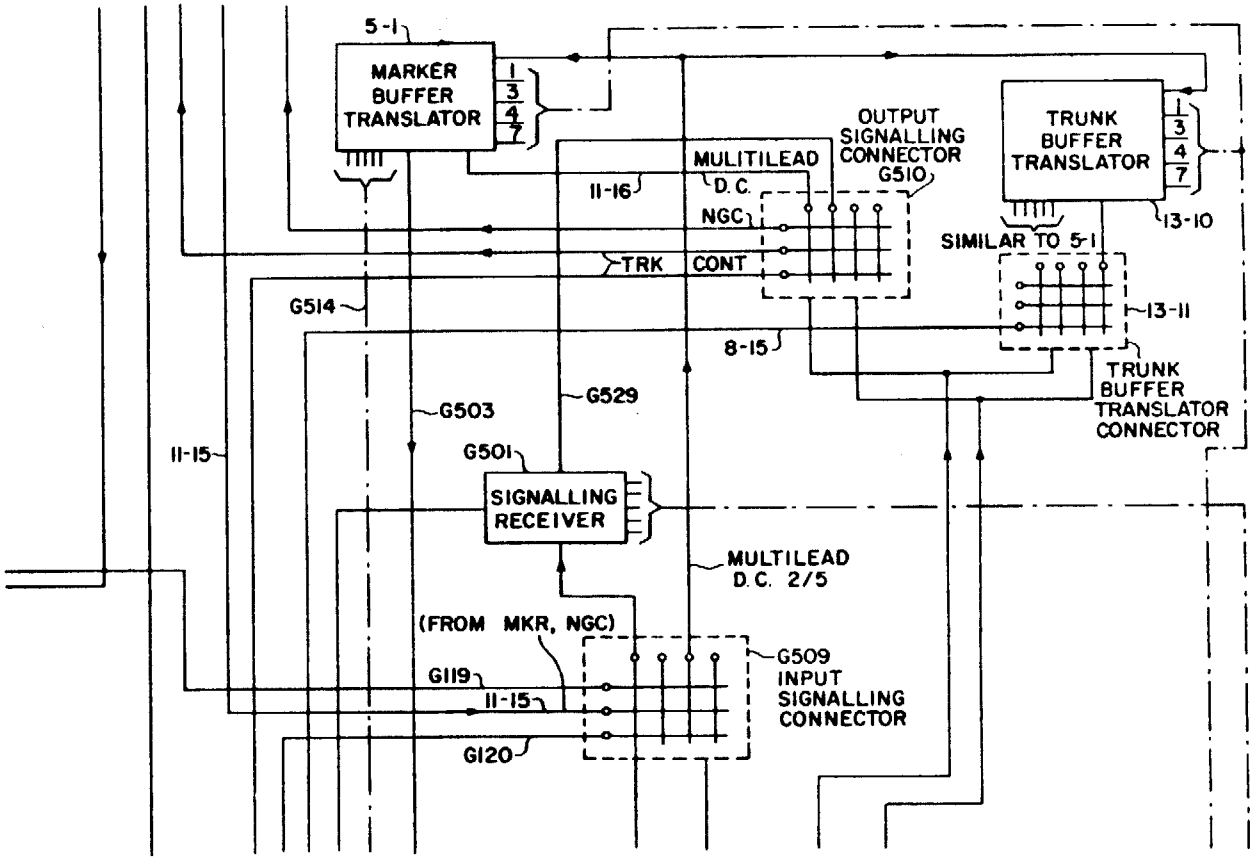

An add-on trunk 4–5, to which subscribers may be connected through the line link frame and trunk link frame via junctor 9–5, has its input terminals connected to the trunk line frame 10–3. PBX its output terminals are connected into a line circuit 4—4 of the interline switching means 4–3. The add-on trunk 4–5 is similar to trunk G111 of FIG. 5 of the aforementioned Gebhardt patent. Control circuitry from the G535 trunk seize and release circuit of that FIG. as well as the output connector G510 are connected to the add-on 4–5 trunk in a similar manner to trunk G111 of the Gebhardt et al. patent as shown in FIGS. 11 and 13 of this specification.

Figure 14:
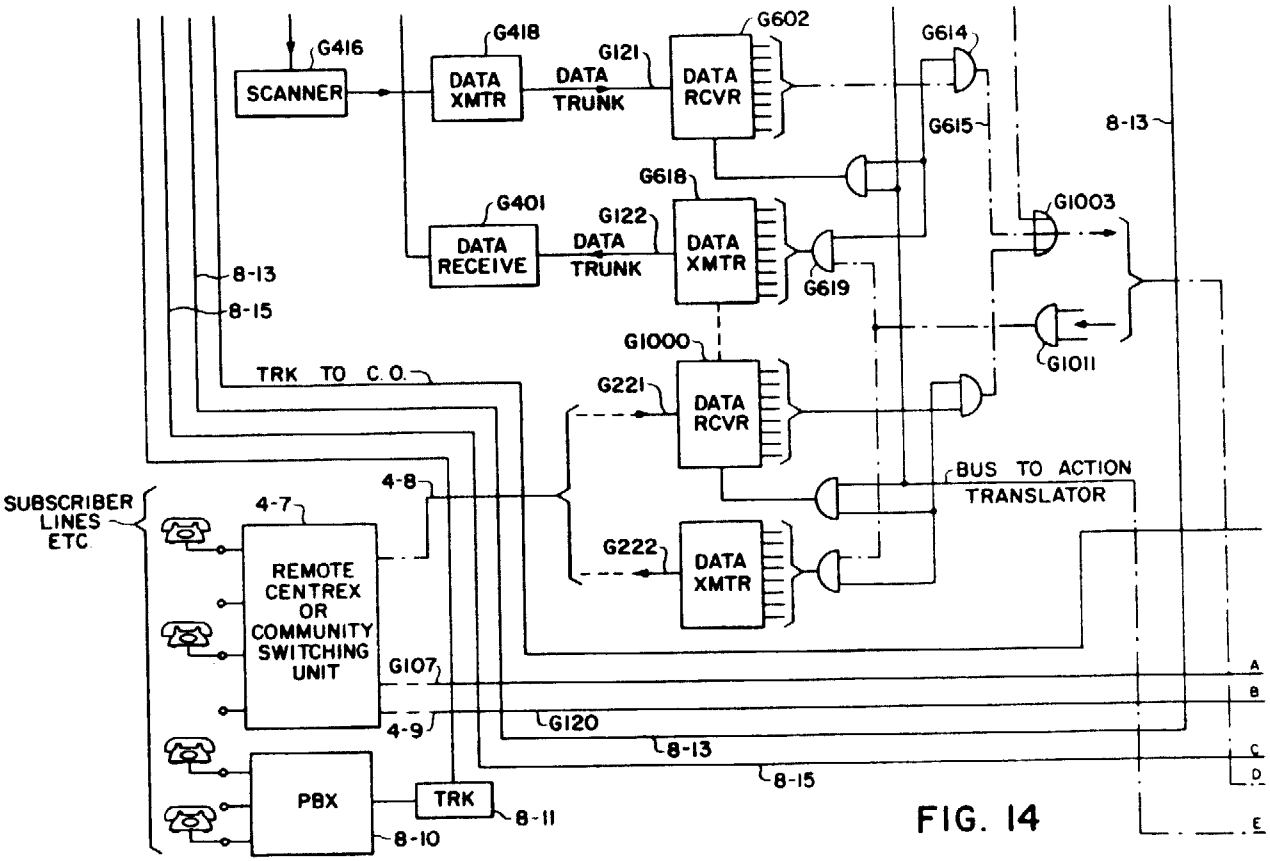
Figure 15:
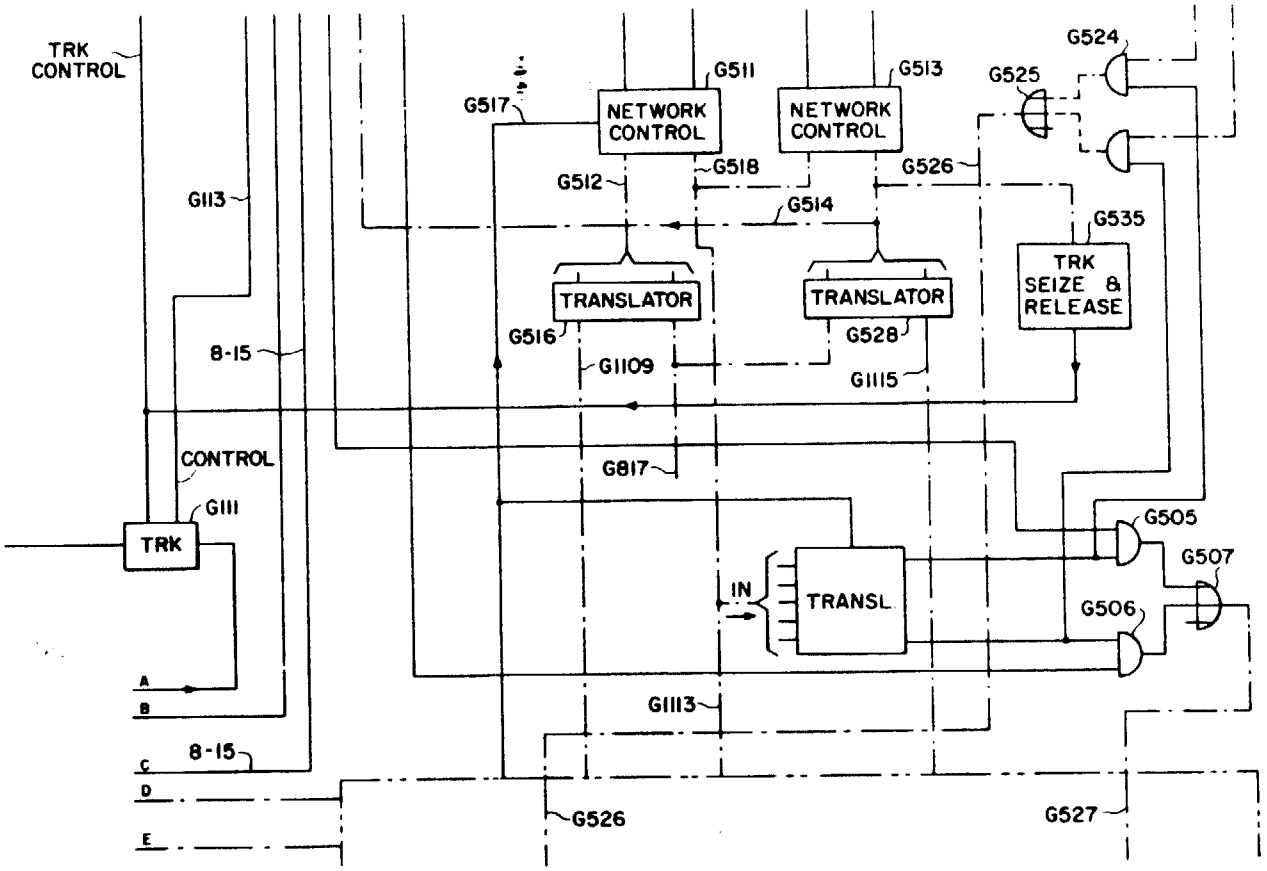
Figure 16:
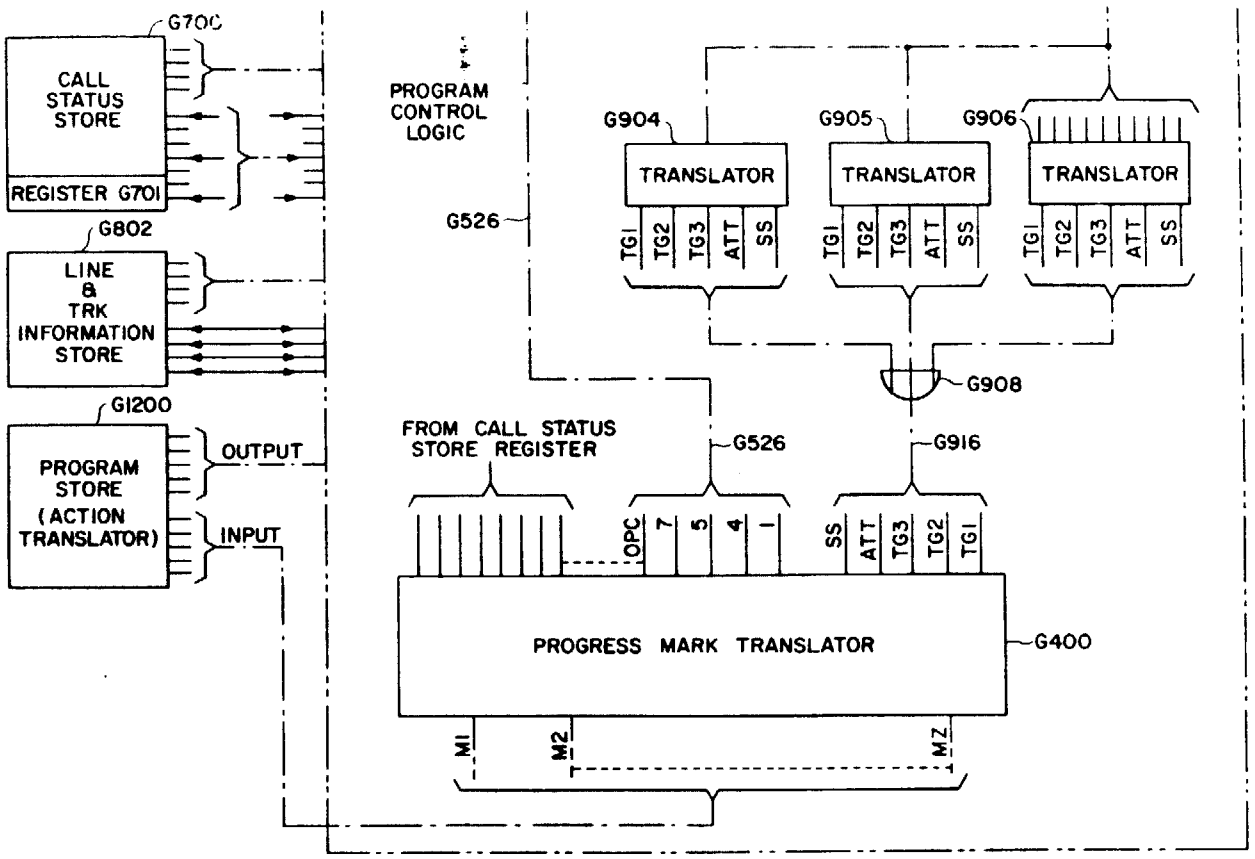
Figure 17:
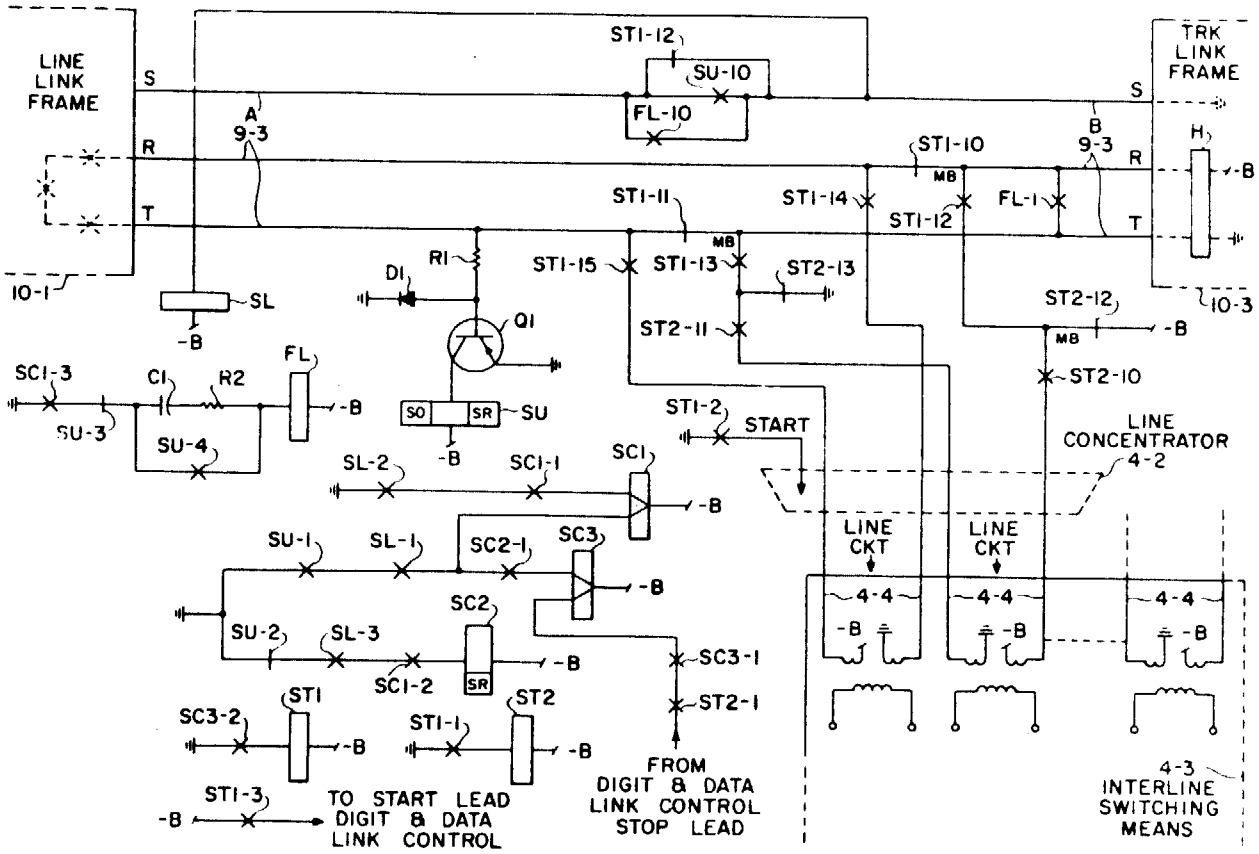
FIG. 17 shows the special service circuit shown in FIGS. 10 and 12 connected to a junctor in detached schematic form.

A remote, centrex, or community switching unit 4–7 of similar type to that shown in FIGS. 3 and 4 of the Gebhardt et al. patent, but located at a remote location to serve as a PBX or to serve a small community, may also be used in conjunction with the central programmed control unit. As is well described in the Gebhardt et al. patent, data trunks 4–8, central office trunks G107, and digit trunks 4–9 are interconnected with the central programmed control unit. As shown in FIG. 14 of this specification, the data trunks G221 and G222 are interconnected with data receivers and data transmitters, which are further interconnected into the logic of the central programmed control unit in a similar manner to the Gebhardt et al. patent. Digit trunks G120 (4–9) terminate on signalling connector G509 and are connected with the signalling receiver G501 as fully described in the Gebhardt et al. patent. Similarly, central office trunks such as G107 are controlled through trunk circuits such as G111. However, in this specification, the central office trunk terminates, as a subscriber's line, on the line link frame of the common control system. Thus, when a subscriber on the remote, centrex, or community switching unit is to be connected to another on the same switching unit, the central programmed control unit in conjunction therewith effects the connection as in the Gebhardt et al. patent.

However, when a subscriber on the remote, centrex or community switching unit wishes to be connected with a subscriber terminated on the line link frame of the common control system, or connected with someone at a distant central switching office, the data trunks and central office trunks in conjunction with the central programmed control unit and the marker effect connection of the call without requiring pulsing of the subscriber's line, since the information as to which called party is desired is readily transferred into the marker as if it had already been pulses into the originating register. A similar procedure occurs with respect to incoming calls to the remote switching unit from a remote trunk or from a line terminated on the line link frame. This will be described in more detail below, with respect to the processing of a call. Thus centrex service may be conveniently provided.

4. DETAILED OPERATION

The following will be a description of the operation of this invention, with respect to the processing of various types of calls. During the description of various stages of a call, the operation of each element of the invention will become apparent.

4.1 Abbreviated Dialing

A subscriber, to whom the special facility of abbreviated dialing is extended, gives a list of directory numbers which he wishes to dial in an abbreviated manner to the telephone company. The number is then stored in the line and trunk information store of the central programmed control unit, in a manner well known by those skilled in the art understanding the Gebhardt et al. patent. Certain abbreviated (for instance, one or two digit) numbers are assigned to each directory number to be dialed. After the assigned abbreviated numbers are provided to the subscriber, he can henceforth use those numbers, prefixed for instance by the digits 11, to communicate with the corresponding subscriber's lines. The central programmed control unit will effect a translation to the full directory number as described with respect to FIG. 6 earlier in this specification. The storage of the line information in the line and trunk information store is accomplished by means of interchangeable programming, and may be kept up to date on a day to day, week to week, or other interval as preferred by the management of the telephone switching system. The facility for changing the program and storing data for this and other special services mentioned in this specification, is fully described in the aforementioned Gebhardt et al. patent and forms a system component of this invention by itself; the reader is referred thereto it will therefore not be described in detail.

The process of a call requiring abbreviated dialing will be described as if the subscriber does not have the facility for dial transfer (although he could have). For the sake of simplicity of description, it will be assumed that the junctors connecting the line link frame and trunk link frame are complete, through the special service circuit, that is to say they are not split, although after understanding the description below with respect to dial transfer, it will be obvious to those skilled in the art how such a call takes place through a junctor 9–3 containing a special service circuit.

As described in the aforementioned A. J. Busch patent with respect to the common control switching system used in this invention, a subscriber who wishes to perform a call lifts his handset, releasing his hookswitch, and his line is connected to line switches 10–2 on the line link frame 10–1, via a junctor 9–3 or 9–5 to the trunk link frame 10–3, and through trunk switches 10–4 to an originating register 11–4, under control of a marker 11–1. The originating register 11–4 returns dial tone over the same transmission path to the calling subscriber, who then proceeds to dial directory digits of a called subscriber. Assuming the 11 prefix in not dialed, the originating register 11-4 will bid for service of the marker 11-1 which will cause the call to be processed in the normal manner.

However, if the originating register 11-4 receives a series of digits prefixed by 11, for instance 11XX, it recognizes that this is an abbreviated call in a similar manner as it recognizes other types of abbreviated calls (for instance, single digit, to call an operator), and will initiate further processing after waiting for only one or two additional digits, instead of the usual seven or ten.

Having not only the dialed digits, but also the class of service and line location of the calling subscriber's line, the originating register 11-4 seizes a marker via the originating register marker connector 11-5. The marker recognizes the class of service and acts accordingly. If the calling subscriber's line does not have abbreviated dialing class of service, and has dialed the 11 prefix, a simple relay logic circuit well known to those skilled in the art in the marker causes the marker to connect the subscriber's line to a tone trunk indicating "no such number."

However, if the class of service indication is proper, a similarly designed relay logic circuit actuated by both the 11 prefix and presence of the proper class of service indication causes the marker to close representative make contact 11-12 in the number group connector 11-10, instead of contact 11-11. Make contacts 11-12 provide a circuit from the marker to the marker bid scanner 5-2 to bid for service of the central programmed control unit, while contact 11-13, later to be closed, provides a circuit to transfer the stored digits into the central programmed control unit.

Switch 11-12 being closed, which provides a "mark" or ground on lead 11-14 to the marker bid scanner 5-2, indicates a bid for service for the central programmed control unit. The marker bid scanner 5-2, scanning each of its input transmission paths synchronously, assigned a time division to each input path, in a manner well kown in the art. Thus the data receiver translator 5-3, by interpretation of the time slot containing the bid for service, translates this interpretation into a bid for service mark on one of is output leads, for instance G1012, in a form required by the logic circuits connected thereto. The bid for service is noted by the central programmed control in a manner similar to a bid noted from a data receiver such as G602, as described circa page 39 in the Gebhardt et al. patent. The information provided by the data receiver translator 5-3, in a manner similar to the data receiver G602 consists in one "start" bit, eight address bits identifying what piece of equipment is requesting service (for instance the particular marker), one supervisory bit, indicating the "on" state of the equipment which is requesting service, and one parity bit. The bits, of course, refer to binary digits required by the central programmed control unit.

Acting in a similar manner to that required for a service request over a data link through data receiver G602 as described in the Gebhardt et al. patent, the program control logic proceeds to operate signalling connector G509 by network control G511 through buses G512 and G518 and connects an idle marker buffer translator 5-1 to signalling transmission bus 11-15 leading from the detected number group connector. As previously described, the signaling transmission bus may contain wires for a two-fifths direct current code digit transfer from the marker through the number group connector 11-10 to the marker buffer translator 5-1, and a "mark" wire to provide a "ready" indication from the marker buffer translator 5-1 to the marker 11-1.

Upon closure of the appropriate crosspoint in the G509 signalling connector, the marker buffer translator 5-1 provides a "ready" indication on the aforementioned "mark" wire. This "ready" indication causes the marker to close number group connector contact 11-13 in order to transfer the calling line location and the dialed 11XX digits in two-fifths code to transmission path 11-15, and thus to the marker buffer translator. The register buffer transceiver translates the dialed digits into binary code on the 1, 3, 4, and 7 leads, for further processing through logic gate G524, in a similar manner to digits received from signalling receiver G501 or G502, in the aforementioned Gebhardt et al. patent.

After processing through OR gate G525, the binary signal proceeds via bus G526 into the appropriate input port of the progress mark translator G1100.

Meanwhile, an indication of what type of special service call is to be processed (as indicated by the dialed digit prefix such as 11) is transmitted by the marker buffer translator 5-1 over transmission path G503 via gates G506 and G507 into an idle translator such as G904. In response to the special service indication, the translator G904 applies an output signal on the signalling path SS, which leads through OR gate G908 into the progress mark translator G1100. An output signal on the SS signalling path and received by the progress mark translator is interpreted to mean that the call is a "first level call" (abbreviated dialing, variable transfer, etc.). The progress mark translator G1100 then proceeds to operate in accordance with the particular program corresponding to a "first level call," stored in the program store G1200 (action translator).

The signals on transmission paths G526 and G916 transmitted into the progress mark translator G1100 thus provide it with the information that the particular number group connector being served is connected to a marker buffer transceiver, and that a particular type of special service call is to be processed. The progress mark translator then acts to control the action translator (program store) G1200 over leads M1 to MZ, acts to update the call progress mark in the call status store G700 and its register G701 to indicate that the number group connector is attached to a marker buffer translator and that it has determined that a special call having prefix 1 has been originated. The progress mark translator G1100 then orders the remainder of the program control logic to find an idle path to the same or another idle marker buffer translator which can return the required translated digits to the number group connector. It then updates the progress mark in the call status store G700 and in the register G701 to indicate that the number group served in the predetermined time slot has originated a prefix 1 type of call and that a path has been assigned to an idle register buffer translator for pulsing to the number group connector and marker but has not yet been established.

Subsequent operations of the program control logic establishes a path from the selected marker buffer translator to the number group connector for outpulsing the full directory number of the called subscriber's line and location number of the calling subscriber's line in the common control system in a manner analogous to that for connecting a trunk such as G111 of FIG. 5 in the Gebhardt et al. patent for the case of a prefix 9 type of call originated at a PBX associated with the central programmed control unit, the network control G513, instead activates an output connector, similar to G510, to connect the output bus 11-16 of the selected marker buffer translator 5-1 to bus 11-16 leading directly to the marker 11-1.

The 11XX dialed digits and calling line location codes have in the meantime been received by the progress mark translator G1100 over leads G526 from the marker buffer transceiver 5-1. The progress mark translator G1100, action translator G1200, line and trunk information store G802, call status store G700, and call status store register G701 operate cooperatively on a program controlled basis, and refer to the line location of the calling line in the line and trunk information store G802 to note that the particular request (11 prefix) is for completion of an abbreviated dialed call, to verify that the full number corresponding to the X or XX is stored in the memory of the line and trunk information store G802. The full corresponding number and the calling line location code are drawn out of the line and trunk information store G802 and are outpulsed in binary form over transmission bus G1115, through translator G528, over transmission bus G514 into the marker buffer translator 5-1. The marker buffer translator 5-1 receives the binary digits, translates them into two-fifths DC code form, and then transmits them into bus 11-16 through output signalling connector G510.

After receiving the seven or ten digit translated information from the marker buffer translator as if it had come from the originating register, the marker releases the originating register marker connector 11-5 and, thus the originating register 11-4 in the normal manner. A full set of directory number digits having been received, as well as the calling line location, the requirement for a bid for service of the central programmed control unit is obviated and hence the bid for service of the scanning input point of the marker bid scanner is removed. This is accomplished by the marker causing contacts 11-12 and 11-13 to be opened in the number group connector 5-1. The marker bid scanner causes 81215 of the entire central programmed control unit from servicing the call, in a manner described in the aforementioned Gebhardt et al. patent. The signalling and output connectors G509 and G510 are thus disconnected, as well as the marker buffer translator 5-1 used during the processing of the call. The entire central programmed control unit is thus restored to an idle condition. It should be understood that the aforementioned operations by the central programmed control unit normally take such a small interval of time, that the calling subscriber does not detect any extraordinary delay.

The marker in the common control system, on receiving the complete unabbreviated called subscriber's directory number proceeds to seize a number group via a number group connector, close representative contact 11-11, and receive a translated line location number corresponding to the full directory digits. Since there is no abbreviation of the directory number, nor prefix 11, a bid for service of the central programmed control unit is not initiated.

The marker on receiving the called line location proceeds to set up a transmission path from the calling subscriber's line on the line link frame 10-1 to a trunk on the trunk link frame 10-3 to another subscriber terminated on the line link frame, or to an outgoing trunk, in the normal manner, as is well described in the aforementioned A. J. Busch patent. Thus a subscriber having the provision for this special service can dial an abbreviated number prefixed by a predetermined code such as 11 to certain preselected customers, and readily be connected thereto.

4.2. Variable Transfer

The process of the ringing of a subscriber's line different from the one whose directly digits have been dialed will be discussed below with respect to two different types of sequences:

1. Registration of the transfer information, whereby information as to which subscriber's line should be rung instead of the dialed one is entered into a memory of the central programmed control unit, and
2. Request for connection, whereby a calling subscriber wishes to be connected to the transferring subscriber's line. As with the description of abbreviated dialing, for the sake of simplicity it will be assumed that the junctor in the common control system are not split and that there is no operation of interest of the special service circuit.

4.2.1. Registration of transfer information

As in the case of the initiation of a normal call, when a calling subscriber lifts his handset, thus closing his hookswitch, a marker causes a transmission path to be set up within the line switches in the line link frame, junctors, and trunk switches in the trunk link frame, to connect an originating register to the calling subscriber's line, as described in the aforementioned A. J. Busch patent. Dial tone is thereby returned to the calling subscriber, who begins dialing his digits response. As previously described, if a normal seven or ten digit code is dialed, the common control system completes the call in the normal manner. However, should the subscriber wish to use the variable transfer feature, he dials a predetermined prefix code, such as 12, followed by the directory number of the station set to which he wishes his incoming calls transferred.

Once the prefix 12 code is dialed as well as the remainder of the dialed number, the originating register contains in addition the calling subscriber's line location and class of service, and a marker is then seized, acting in accordance with this information. If the class of service indicates that the calling subscriber's line does not have the variable transfer feature, but prefix 12 was dialed, the transmission path leading to the calling subscriber is connected to a source of tone indicating that a wrong or nonexistent number has been dialed.

However, if the proper class of service is provided to the calling subscriber, and he has prefixed the dialed number by a 12, the marker 11-1 seizes a number group connector 11-10 and closes representative contact 11-12, placing a bid for service on the marker bid scanner 5-2 in a similar manner to that described above with respect to an abbreviated dialing type of call. Similarly, the data receiver translator 5-3 provides information to the central programmed control unit as to what piece of equipment is requesting service, resulting in the connection of an idle marker buffer translator 5-1 to the waiting number group connector 11-10. The marker, through the number group connector 11-10 transfers the dialed digits and calling line location numbers into the register buffer transceiver in two-fifths DC code, which translates them into binary code and pullses them into the program control logic via gates G524, G525, and bus G526. On reception of the dialed digits and calling subscriber's line location numbers, the central programmed control unit proceeds with the processing of the call.

The operations of the progress mark translator G1100, action translator G1200, line and trunk information store G802, call status store G700, and call status store register G701 include: referring to a memory location corresponding to the equipment location of the calling subscriber's line in the line and trunk information store G802, locating a spare memory space in the line and trunk information store G802 where the station number to which the customer wishes to have his subsequent incoming calls transferred may be stored, providing a marking in the calling subscriber's normal line location memory space in the line and trunk information store G802 to indicate the location of the spare memory space, and storing the remote station number in the spare memory space.

As the remainder of the procedure in the central programmed control unit generally follows that described above with respect to an abbreviated dialing call, it will not be described again here. However the marker buffer translator 5-1 is then connected through an output connector G510 to the marker 11-1. The line location number of the transferring subscriber's line in the common control system and the directory number of the transferred-to subscriber's line is transmitted to the marker buffer translator 5-1 via transmission path G514 in binary code, translated into two-fifths direct current code, and is returned to the marker 11-1 via bus 11-16 as if it had come from the originating register via the originating register 11-4 marker connector 11-5 as an originating call. The marker 11-1, receiving a called subscriber's directory number seemingly from the originating register, but actually from the central programmed control unit, releases contact 11-12 in the number group connector 11-10, liquidating the bid for service, in the marker bid scanner 5-2 allowing the central programmed controlled unit to be restored to an idle condition. The call is the completed in the normal manner, by requesting a translation by the number group 11–9 via contact 11–11, the marker then acting to set up a transmission path between the transferring subscriber's line, and transferred-to subscriber's line.

When a subscriber at the transferred-to subscriber's line answers his station set, the calling subscriber then advises him that he should accept subsequent transferred calls. The connection between the transferring and transferred-to stations thus allows the transferring subscriber to verify that he has dialed the proper transfer code.

It the transferred-to subscriber's line is busy when the call is attempted, the transferring subscriber may subsequently verify the registration of the transfer by dialing the 12 ABX XXXX code repeatedly until a connection to the transferred-to station is completed. This procedure will not nullify or change the transfer information contained in the line and trunk information store. The transferring subscriber may also dial any other directory number in the normal manner without affecting the information stored in the line and trunk information store, but all incoming calls to his line will ring the transferred-to subscriber's line.

4.2.2. Request for connection

Subsequent request for a connection to the subscriber's line whose incoming calls are being transferred to another station may originate from any subscriber's line associated with the common control system, from any subscriber's line associated with the remote switching unit which is controlled by the central programmed control unit associated with the common control system according to this invention, or from another telephone switching system which is connected via incoming trunks to the common control telephone switching system. A call to the transferring subscriber's line originating from an incoming trunk will be described below, as an example.

When a request for service over an incoming trunk is received, an incoming register 11–7 is connected via an incoming register link 11–6 to the incoming trunk 9–2. Incoming directory number digits are received over the incoming trunk 9–2 and are registered in the incoming register 11–7.

The marker is then seized, and in turn is connected to a number group 11–9 via a number group connector 11–10 in order to obtain an indication of the line location of the called partly digits held in the incoming register as described in the aforementioned A. J. Busch patent. If the number group 11–9 contains an indication that the particular subscriber's line called has a class of service which allows the variable transfer feature, the marker in response opens contact 11–11 and closes contact 11–12 in the number group connector 11–10, placing a bid for service on the marker bid scanner 5–2.

With representative switch 11–12 closed, the bid for service is entered into the marker bid scanner 5–2 similar to the manner earlier described. The data receiver translator 5–3, in recognizing the scanner time slot in which the bid for service is entered, recognizes the particular number group connector 11–10 which has requested service, and thus identifies it to the central programmed control unit. In a similar manner to that described earlier the central programmed control unit causes the signalling connector G509 to interconnect an idle marker buffer transceiver 5–1 to the number group connector via transmission path 11–15. The bus 11–14 between the marker buffer translator 5–1 and number group connector 11–10 is multilead for carrying two-fifths direct current code, with one additional lead for a "ready to receive" indication.

After the crosspoint in signalling connector G509 is closed, a "mark" indication is given to the "ready to receive" lead causing the marker to close representative switch 11–13 in the number group connector 11–10 allowing the directory number of the called subscriber's line to be transferred from the incoming register 11–7 through the marker 11–1 and number group connector 11–10, via bus 11–13, into the signalling connector G509 and to the marker buffer transceiver 5–1. The marker buffer transceiver translates the two-fifths direct current coded directory number into binary code and transmits it via gates G524, G525, and cable G526 into the progress mark translator G1100.

The input information in binary form over the bus G526 enables the progress mark translator G1100, action translator G1200, line and trunk information store G802, call status store G700, and call status store register G701 in the central programmed control unit to proceed with processing in a similar manner to that described earlier. In this case, however, the central programmed control unit has input information indicating that this is a marker request for completion of a call to a line that is identified in the line and trunk information store as one that may have utilized his variable transfer feature, since the class of service mark was provided by the number group 11–9. The central programmed control unit finds in the line and trunk information store G802 that the called subscriber has requested completion of all incoming calls to a designated transferred-to subscriber's line. For this particular case, it finds that the transferred-to subscriber's line is being served by the main common control switching system and therefore closes a signalling path under control of network control G513 through the output connector G510 from the marker buffer translator 5–1 to the marker via bus 11–16. The marker buffer translator 5–1 then receives translated information as to the directory number of the transferred-to subscriber's line over bus G514 in binary from from translator G514. The marker buffer translator 5–1 translates the binary digits into a form suitable for use by the marker 11–1, and transmits them via two-fifths direct current code multilead bus 11–16 through the output connector G510, via bus 11–16 into the marker as if it had come directly from the incoming register. The bid for service of the central program control unit is dropped, and representative switch 11–1 in the number group 11–10 to the number group 11–9 is closed in order to obtain a translation of the transferred-to directory number to its line location. The entire central programmed control unit is thus restored to an idle condition, including representative switches 11–12 and 11–13 in the number group connector 11–10 with the reception of the transferred-to subscriber's line location, the marker completes the call to that location in the normal manner.

It will be noted from the above that the processing in the central programmed control unit involves a substitution of the directory number of the transferred-to station rather than returning to normally assigned subscriber's directory number. In case the subscriber had not previously requested that such a call be transferred to a remote station, a mark would have existed in the line and trunk information store G802 indicating that the call was to be completed to the subscriber's line, rather than to any other transferred-to line. The central programmed control unit would therefore have sent the normal subscriber's directory number via the marker buffer translator 5–1 and number group connector 11–10 into the marker to enable it to complete the connection.

The customer may cancel the variable transfer request at any time by originating a new variable transfer request, designating his own subscriber's line as the line to which all incoming calls are to be directed. The procedure is the same as described above, except that the customer dials his own directory number after the special prefix code 12.

Upon recepit of the transfer information, the central programmed control unit verifies in the memory space of the calling subscriber's line in the line and trunk information store G802 that the last four digits correspond to his normally assigned number. The verified information and its marking in the memory space of the subscriber's line location enables the central programmed control unit to locate the memory space in the line and trunk information store G802 where the transferred-to subscriber's directory number was stored, to cancel its registration in the memory space, and to restore the memory space to contain a binary digit reference indicating that when subsequent incoming calls are to be completed, they should be routed to the original subscriber's line. The central programmed control unit thereupon sends the subscriber's number of the calling line into the marker, as described above, via the marker buffer translator 5–1 and number group connector 11–10. The marker is thus actuated to complete the call to the original subscriber's own line, which is of course busy. The marker then connects a "line-busy" tone to the calling subscriber's line, indicating to him that the transferred registration has been canceled in the central programmed control unit. Conditions are thus returned to normal.

If the transfer request from the originating subscriber involves completion to a subscriber's line terminated on a remote switching unit, and the remote switching unit is designated by an office code differing from that of the lines served from the instant common control system, the processing of the call would correspond to that described in section 4.3.

If the request for transfer had required a tandem switch through the common control system to enable completion to a subscriber's line terminated on another central office system, the central programmed control unit program would have indicated that the central programmed control unit should transmit the complete ABX XXXX directory number of the remote station into the marker. Assuming the common control system were in fact equipped for tandem switching, the marker and associated sender (not shown) would have proceeded to complete the connection over a trunk to the distant central office switching system in the normal manner.

4.3. Calls to a Remote Switching Unit

There are three general types of calls involving a remote, centrex or community switching unit, herein referred to as a remote switching unit. The first type of call is an intraremote switching unit call, wherein a subscriber's line originating on the remote switching unit must be connected to another subscriber's line terminated thereon. The remote switching unit is similar to that described as a PBX and shown in FIGS. 3 and 4 of the Gebhardt et al. patent, and is connected to a central programmed control unit similar to that described and shown in FIGS. 5 to 12 thereof. Consequently, this system is similar to that described in the Gebhardt et al. patent, and an intraremote switching unit call operates identically to that described therein.

The second type of call involves a request for connection between a subscriber's line originating on the remote switching unit and is terminated on the common control system, or on other switching systems upon which the remote switching unit homes by the use of a central office trunk. The central office trunk corresponds to that shown in FIG. 5 of the aforementioned Gebhardt et al. patent, and its operation is disclosed therein.

When the remote switching office terminates on a common control system, after the calling subscribed dials his digits which are received and registered by the central programmed control unit, a central office trunk G111 which leads to the line link frame in the common control system is seized. This effectively places an off-hook condition on the line circuit in which the central office trunk terminates, causing the marker to connect the originating register thereto via the trunk link frame, a junctor, and the line link frame. The central programmed control unit then causes the central office trunk to be pulsed according to the dialed digits, allowing the digits to be received in the originating register and causing the common control system to complete the call either to a line terminated on the line link frame or to an outgoing trunk, in the normal manner.

However, it may be understood by those skilled in the art that once the digits are registered in the central programmed control unit prior to the time they are pulsed out over the central office trunk, the central programmed control unit may be programmed to seize not only an idle central office trunk to the line link frame, but also an idle marker. Having the information of which central office trunk it has seized, this information can be transferred to the marker in order that a transmission path from the trunk through the line link frame on which the central office trunk is terminated, an idle junctor, and the trunk link frame, to an outgoing trunk, or back to a subscriber's line terminated on a line link frame. Once the transmission path has been set up, data may be transmitted to the central programmed control unit to divert it to regain its idle status, whereupon the marker is also released to an idle condition.

The third type of call is one in which a transmission path must be completed from a subscriber's line originating on the common control system, or from an incoming trunk, to a subscriber's line terminated on the remote switching unit. Normally, for PBX trunks or central office trunks terminated on the line link frame of the common control system, complex modifications were required for effecting pulsing of the called line digits over such trunks to the remote switching unit. These modifications included a provision for control of digit senders on the line side of the line link frame the function of sending digits over the control office trunk sometimes being called line link pulsing 81400. When digits have been dialled for the completion of a call from the common control system to the remote switching unit 4–7, the marker 11–1 of the common control system receives the dialled number of the called station in a normal manner and seizes a number group 11–9 via a number group connector 11–10, to determine the equipment location of the called line and a service classfication. For completion to a remote switching unit, the class of service mark indicates to the marker that the desired station is terminated on a remote switching unit rather than appearing directly on a line link frame of the common control system. The marker then switches the number group connector 11–10 in a manner previously described to bid for service on the marker register scanner 5–2. In response, in the manner described above, an idle marker buffer translator is connected to the marker via the number group connector 11–10 via transmission path 11–15 and signalling connector G509.

The directory number information is then passed over transmission path 11–15, through signalling connector G509, into the marker buffer translator 5–1 which translates it into binary code, whereupon the digits are transferred into the program control logic via bus G526 as described earlier. The remote switching unit 4–7 is then identified in the line and trunk information store by translation of the directory number. An idle trunk from the line link frame to the particularly designated remote switching unit is also identified. The program in the central programmed control unit is modified in a well-known manner to enable this information to be used not only to complete the connection between the called subscriber's line and the selected trunk at the remote switching unit as disclosed in the Gebhardt et al. patent, but also to provide information to the waiting marker regarding the line location of the selected trunk terminated on the line link frame of the common control system, as described above. The information as to the line location of the selected trunk on the line link frame is provided to the marker 11–1 by the marker buffer translator 5–1 and number group connector 11–10 while connections were being established at the remote switching unit between the called subscriber's line and the central office trunk to the common control system. In response to the information of the line location of the selected trunk, the marker 11-1 in the common control system causes the completion of a transmission path between the incoming trunk or calling subscribers line terminated on the line link frame as extended through the trunk link frame, to the central office trunk terminated on the line link frame leading to the particular remote switching unit involved.

If, in the process of attempting to complete the call at the remote switching unit under its control, the central programmed control unit has determined that either the called subscriber's line or all trunks to the common control system from the particular remote switching unit were busy, information as to the location of a source of busy signal is transmitted to the marker via the marker buffer translator. Acting on this information, the marker completes the call to the location of the source of busy signal, indicating to the calling subscriber that the called line is in use, or that all trunks to the remote switching unit are in use.

It may be seen that with the marker and central programmed control unit operating in consort as described above, an incoming call to a subscriber's line on a remote switching unit may be completed without the necessity of interruption by an operator, without necessity of line link pulsing, and without necessity for dialing an excess number of digits. Thus it seems to a calling subscriber that the called subscriber's line is private and individual, and terminated on the line link frame of the common control system. The service to the remote switching unit is thus equivalent to that commonly described as Centrex service, and the additional special service features described herein are also simultaneously extended.

4.4. Dial Transfer

As discussed previously, dial transfer allows a call terminated at a particular subscriber's line to be transferred to another, when the subscriber having the dial transfer service initiates a hookswitch flash and then dials the directory number of the subscriber's line to which the call is to be transferred. In the description to follow, it will be assumed that the previously described modified junctors (such as junctor 9-3) are in the system. All calls originating at subscriber's lines which have the dial transfer feature are routed through the special type of junctor by the marker, as described earlier in this specification. As mentioned earlier, special line link frames having only the special junctors terminated thereon may be used, or the special junctors may be distributed throughout the system.

In the description to follow below, it will be assumed that the junctor is idle, and the SU, SL, SC1, SC2, SC3 and FL relays in the special service circuit attached to junctor 9-3 are released and idle. The ST1 and ST2 relays are also released. This will be the case for all junctors to which the special service circuits are applied.

Assuming that an incoming call is to be terminated at subscriber's line 10-6 from incoming trunk 9-2, ringing current is applied to the ring lead, as is normally done in the case of single party type lines. It has been found that although ringing current is applied to the ring lead, the tip lead acquires a potential to ground alternating between +3 and −9 volts at a 20 hertz frequency. To the ring lead, as is well known, a 90 volt alternating potential is applied superimposed above a 48 volt direct potential. A transistor circuit having its base electrode connected to the tip lead, collector circuit connected to the SU relay, and its emitter electrode connected to ground is thus operated on the negative portions of the ringing cycle. However, the SU relay is specifically chosen to be a slow operator type, and thus not respond to the 20 cycle per second frequency. The diode bypasses the base-emitter circuit during positive voltage portions of the ringing cycle.

It may be seen that the SC2 relay, which is a slow release type of relay, is operated via a make contact SL-3 of the SL relay, a make contact SC1-2 of the SC1 relay and a break contact SU-2 of the SU relay. The SC1 relay is operated through make contacts SL-1 and SU-1 of the SL relay and SC1 relay, and the SC3 relay is operated through make contacts SL-1, SU-1 and SC2-1 of the SL relay, SU relay, and SC2 relay. The SC1 relay can also be operated through a second winding by make contacts SL-2 and SC1-1 of the SL relay and SU-1 relay. Thus it may be seen that until the SL relay is operated, neither of the SC1, SC2 or SC3 relays may operate.

The SL relay is operated during the time that the junctor is seized and a transmission path extended from the line link frame to the trunk link frame, but the SU relay is only operated during long negative pulse intervals on the tip lead to set up the SC1 relay, which locks on itself, and prepares an operating path for the SC2 relay.

The sequence of operations is as follows:

A transmission path from the trunk link frame to the line link frame is extended via junctor 9-3. Since relays ST1 and ST2 are idle, the break contacts which are later to split the tip, ring and sleeve leads are closed, and the transmission path is continuous. Since the crossbar switches normally used in the line and trunk link frames require their holding magnets to be held via ground potential normally extended through the sleeve lead of the junctor from a trunk, ground potential appears on the sleeve lead at the time when the transmission path is extended. Since the relay winding of the SL relay is connected between −48 volts and the now extended ground potential, it operates, closing its make contacts and preparing the first stage of the operation path for the SC1, SC2 and SC3 relays.

The ground potential is extended on the sleeve lead of the junctor under two general conditions. The first condition is if a ringing generator is to be connected to the subscriber's line via the trunk link frame, junctor, and line link frame in order to alert a called subscriber that the call is to be answered. The second condition is if the subscriber desires to make a call and lifts his telephone handset in order to be connected to an originating register. In both cases a transmission path must be completed through the line and trunk link frames via a junctor, thus requiring ground potential to be applied to the sleeve lead in the normal manner.

The next occurrence is either ringing current being applied to the junctor from a ringing generator, or dial pulses being applied from the subscriber's line.

Since it was mentioned above that subscriber lines which are to be leading through the modified junctors must be all rung from the ring side, ringing current is applied to the ring lead, normally by a potential of 90 volts alternating potential superimposed on a −48 volt direct potential, at a frequency of 20 hertz as described above. However, because of inherent impedance in the tip lead it has been found that a potential with respect to ground of +3 volts to −9 volts at the ringing frequency is normally detected. Although the transistor Q1 circuit which operates the SU relay from the tip lead can operate during the negative portions of the ringing current described above, the SU relay is purposely designed to be slow operating as well as slow release, and not respond thereto. Therefore, the SU does not operate during the ringing period, thus preventing the SC1, SC2 or SC3 relays from operating.

When the subscriber lifts his handset, thus closing his subscriber loop, either before or after ringing, a potential more negative than −3 volts is normally placed on the tip lead. Transistor Q1 now operates, causing the SU relay to operate through its collector circuit.

When the SU relay is operated, a transmission path has already been extended through the line and trunk link frames via junctor 9-3, ground potential has been applied to the sleeve lead, and the SL relay operated. Thus a conduction path is extended to make contacts SL-1 and SU-1 of the SL and SU relays, to a winding of the SC1 relay. The SC1 relay locks up to make contact SL-2 of the SL relay via its own SC1-1 make contact. As long as the status of the junctor remains such, the SC1 relay remains locked up, until the transmission path is released by the termination of the call which causes release of the trunk, ground on the sleeve lead, release of the SL relay, and the release of the junctor.

If the subscriber should however begin dialing, the slow release characteristics of the SU relay do not allow it to release, as the dialing opens the loop for periods not ordinarily exceeding 60 milliseconds. The slow release characteristics are such that it will not allow the SU relay to release unless the loop is open for greater than, for instance, 100 milliseconds. It may therefore be seen that there is a large safety margin to keep the SU relay operative. During the interdigital dialing interval, of course, the SU relay is held operated. Since the SC3 relay has not been affected, the ST1 and ST2 relays remain unoperated and the junctor path remains continuous.

When the call is terminated after a normal call, the transmission path is broken in the normal manner as described in the aforementioned A. J. Busch patent, and ground potential is removed from the sleeve lead. Thus the current path for the SL relay is interrupted and it releases, opening the operation path of the SC1 relay. The SC1 relay is thus returned to an idle condition. When potential is removed from the ring lead due to the transmission path being opened, the SU relay also releases.

Assuming that the subscriber wishes to initiate a dial transfer, he depresses his hookswitch, initiating a "flash." Normally the flash is greater than 200 milliseconds, and averages 500 to 1,500 millisecond. Thus during the process of a call, with the SU and SC1 relays operated, a switch hook flash opens the subscriber's line for a longer time than the slow release holding interval of the SU relay, allowing the SU relay to release. Thus it may be seen that a conduction path is present from ground, through the SL3 contact of the SL relay, the locking contact SC1-2 of the SC1 relay, and the break contact SU-2 of the SU relay to operate the SC2 relay. The SC2 relay has slow release characteristics. An operation path is thus prepared for the SC3 relay for when the SU relay reoperates, via contact SC2-1.

With the SU relay released, and the SC1 relay operated, break contact SU-3 and make contact SC1-3 provide a series conductive path for charging of a capacitor C1 - resistor R2 timing circuit, which is in the operation current path of relay FL connected between ground and a source of potential. - B. Therefore, when the SU relay is released during the flashing interval, and the SC1 relay operated, the FL relay operates during the charging interval for capacitor C1. The timing circuit is adjusted to keep relay FL operated for an interval equivalent to the largest expected flash interval, say of approximately 1.5 seconds. Make contact FL-1 of the FL relay is connected between tip and ring leads at portion B of junctor 9-3. Thus it may be seen that during the flashing interval, the tip and ring leads are short circuited, compensating for the open circuit at the subscriber's line circuit, thus keeping the trunk which extends sleeve lead ground in operation, and safeguarding the line and trunk link from holding magnets in a held up condition.

It may also be seen that the slow release characteristics of the SU relay are such that it should release faster than the sleeve release time of the trunk (say 200 ms.), but not during dial pulsing or dialing intervals.

If the hook switch is kept down longer than the timing interval of the FL relay, for instance if the subscriber hangs up, the FL relay releases, opening the path between the tip and ring leads, releasing the trunk, which disconnects ground from the sleeve lead. This release the SL relay, which causes the release of the SC1 and relays SC2, and thus results in release of the entire special service circuit. If the hook switch is released prior to the release of the FL relay, ending a normal flash interval, the SU relay reoperates, and the break contact SU-2 in series with the operation path of the SC2 relay opens, deenergizing it, while make contact SU-1 of the SU relay operates in series with the conduction path of the SC3 relay. With make contact SL-1 of the SL in series with make contact SU-1 of the SU relay, now in series with a make contact SC2-1 of the not yet released (slow release) SC2 relay in the operation path of the SC3 relay, the SC3 relay operates. Make contact SU-4 of the SU relay, connected across the timing circuit C1-R2, operates, discharging capacitor C1 in preparation for another switch hook flash.

However, the operation path of the ST1 relay is in series with a make contact SC3-2 of the SC3 relay, and ST1 relay operates. A make contact ST1-1 of the ST1 relay in series with the ST2 relay which similarly operates, closing a make contact ST2-1 in the series with a second operation coil of the SC3 relay. Also in series with the second operation coil of the SC3 relay is one of its own make contacts SC3-1. The operation path of the SC3 relay continues through a "stop" lead to the digit and data link control, and is normally connected to ground thereat. Thus it may be seen that prior to release of the SC2 relay the ST1 and ST2 relays close, causing the SC3 relay to lock up via its own contact and one of the ST2 relay, to a stop lead on the digit and data link control. The stop lead leads to a contact normally connected to ground, which is opened later by the control when the call is terminated.

When the ST1 relay operates, a make contact ST1-3 connected to a battery supply —B provides a request for service indication on a "start" lead to the line concentrator 4-2 in order to initiate its operation.

The operation of the ST1 relay causes breaking of the tip and ring leads by contacts ST1-10 and ST1-11, causes connection of the line link frame side A of the tip and ring leads to one line circuit of the interline switching means via contacts ST1-14 and ST1-15, and the trunk link frame side B of the tip and ring leads to another line circuit of the interline switching means by contacts ST2-10, ST2-11, ST1-12, and ST1-13, through the line concentrator 4-2. The junctor 9-3 has thus been split and the two ends terminated on the interline switching means 4-3 in line circuits 4—4. The interline switching means 4—4 thus has a call initiation condition placed on it, and prepares to process the call further in a manner similar to that described in the Gebhardt et al. patent with respect to processing a dial transfer type of call.

The memory space and program in the central programmed control unit are such that the control unit may identify the request for service as one originating at the interline switching means 4-3, rather than at one of the PBX's disclosed in the Gebhardt et al. patent. Accordingly, the central programmed control unit now instructs the digit and data link control 4-6 via a data trunk 122 to establish a connection between the line circuit in the interline swtiching means leading to the portion of the junctor A terminated at the line link frame, and a signalling trunk G150 leading to the central programmed control unit, so that dial tone may be returned to the subscriber who requested dial transfer service. Upon return of dial tone, the subscriber dials the directory number of the subscriber's line to which the call is to be transferred.

Within the interline switching means 4-3, two time division periods or slots are selected. One slot is used to set up a two-way connection or transmission link between the line portion A of the junctor 9-3 and an idle add-on trunk 4-5 terminated in a line circuit 4—4 of the interline switching means, and the other slot is reserved for adding the trunk portion B of the junctor 9-3 to the two-way connection. Having selected an idle add-on trunk 4-5, terminated in a line circuit 4—4 of the interline switching means 4-3, the add-on trunk is seized via the trunk seize and release leads and trunk control leads G113. Since the add-on trunk 4-5 is also terminated on the trunk link frame, and has now been seized, the marker is called into action as if an incoming trunk has been placed into service by an incoming call. The marker then connects an idle incoming register 11–7 to the add-on trunk 4–5 in response to the seizure, in the normal manner.

The dialed directory number of the number to which the call is to be transferred is forwarded to the add-on trunk via an idle signalling receiver G501 in a manner described in the Gebhardt et al. patent, and through output connector G401 and control leads G113 to the add-on trunk 4–5. The digits arrive as if they had come from the line circuit leads 4—4 leading from the interline switching means 4–3, or, in the case of an incoming trunk, as if they had come from a distant station.

With an incoming register 11–7 connected to the add-on trunk 4–5 through the trunk link frame, the dialed digits are transferred thereto and thence to the marker, whereupon a call to the transferred-to station is completed from the add-on trunk 4–5 through the trunk link frame 10–3, an idle junctor such as junctor 9–5, and the line link frame 10–1. Junctor 9–5 may, of course, have a special service interconnected therewith similar to junctor 9–5 as described earlier with respect to when a called subscriber's line is being rung.

When the called subscriber answers his station set, he is connected through the line link frame 10–1 junctor 9–5, the trunk link frame 10–3, and add-on trunk 4–5 to the input of the line circuit 4—4 of the interline switching means 4–3, which is interconnected via a single time slot with another line circuit 4—4 leading to the line link frame portion A of split junctor 9–3, and thence to the subscriber wishing to transfer the call. The subscriber connected to the trunk link portion B of the split junctor 9–3 is held, and is connected into another line circuit 4—4 of the interline switchng means 4–3, but in a second time slot. Ground potential is applied within the trunk used on the trunk link frame to the sleeve lead, in order that the frame crossbar switch holding magnets will not be released. Battery and ground are applied to the tip and ring leads in line circuits 4—4 in order to provide talking battery to the subscriber's line, and to hold the trunk operated.

When the customer at the transferred-to station answers his station set, a supervisory signal is received in the central programmed control unit via the add-on trunk 4–5 and its line circuit 4—4 termination in the interline switching means which causes the central programmed control unit to record in its call status store G700 that the call has been answered. The subscriber at the transferring station, and the answering subscriber at the transferred-to station may now communicate without overhearing by the subscriber terminated at the B portion of the split junctor connected to the trunk link frame.

After communicating with the subscriber at the transferred-to station, the originating subscriber may establish a three-way transmission path in the interline switching means by flashing his hookswitch. The SU, SC2 and SC3 relays simply repeat the sequence of events occurring during the previous hooksswitch flash, resulting in the opening and closing of contacts in relays ST1 and ST2. However, the opening of relay SU allows the charging circuit of the FL relay to become operative, thus causing the FL relay to operate for an interval not exceeding the previously determined 1.5 seconds. Relay contacts FL–1 of the FL relay short circuits the tip and ring leads of B portion of junctor 9–3, keeping the trunk to which the junctor is connected on the line link frame operated. If the flash is longer than 1.5 seconds, the line link portion of the junctor 9–3 is dropped. When the other subscriber hangs up his handset opening his hookswitch, the trunk is dropped, causing the ground to be removed from the sleeve lead, deenergizing the SL relay, dropping the SC1 and SC2 relays, dropping the hold magnets in the line link frame and trunk link frame, eventually restoring the complete circuit to an idle condition. But if the flash is shorter than 1.5 seconds, the flashing subscriber's line is restored to normal before relay FL1 deenergizes, allowing the trunk to be held, and effectively transmitting the hookswitch flash into the interline switching means. This signal is received by the interline switching means 4–3, and after translation it is sent over a data trunk G121 to the central programmed control unit. It is then used to transmit the proper instruction to the interline switching means 4–3 to close the time slot transmission path between the B portion of the split junctor 9–3 terminated on the trunk link frame, and the previously established time slot transmission path between the A portion of the junctor 9–3 terminated on the line link frame and the add-on trunk. A three-way transmission path is thereby established.

The transferring subscriber may then open his hookswitch, for instance by restoring his handset to its cradle.

After operation and release of the FL relay as previously described, the trunk connected to the B portion of junctor 9–3 is still held up due to the termination of the junctor to a battery supply and ground in a line circuit 4—4 of the interline switching means 4–3. However, with relay FL unoperated after about 1.5 seconds, and make contacts FL–10 open, ST1 relay operated, and break contact ST1–12 open, and now with the ST1 relay release, make contacts SU–10 are open, breaking ground from the sleeve lead leading to the line link frame. Thus the holding magnets in the line link frame 10–1 are released, restoring the line link frame to an idle condition. Further calls may now be made by the transferring subscriber from his own station set. In response to the idling of the portion A of junctor 9–3, the transmission path to the line circuit 4—4 of the interline switching means leading to the line link frame portion of the junctor is disconnected. That line circuit 4—4 is thus made free to serve other calls. However, the split junctor 9–3 is held busy at the trunk on the trunk link frame, connected to the party who had not requested dial transfer. The junctor is thus prevented from being seized by the marker during a subsequent search for an idle junctor.

If the station set to which the call was to be transferred is busy, a source of busy signal is applied to junctor 9–5 in the normal manner for the common control system. The busy signal is passed through the add-on trunk 4–5 into its line circuit termination 4—4 of the interline switching means, and through the now common time slot transmission path is passed through the line circuit of the interline switching means 4—4 leading to the junctor 9–3 portion A terminated on the line link frame, and is heard by the transferring subscriber. There is no indication, therefore of a supervisory signal indicating that the transferred-to station set has been answered in the central programmed control unit. A timing circuit associated with the call record in the call status store G700 begins to time out, at the end of which the central programmed control unit sends a release signal to the add-on trunk, in a manner described in the Gebhardt et al. patent. The release signal causes the idling of the add-on trunk, and thus the common control system releases the connection between the add-on trunk and the trunk link frame, effectively disconnecting the request that the transferred-to station answer the call. Thus junctor 9–5 is restored to an idle condition.

After restoration of the add-on trunk to an idle condition, a signal is sent to the interline switching means 4–3 by the central programmed control unit to cancel the time slot alloted to the add-on trunk link circuit 4—4. The signal causes the digit and data link control 4–6 to open the start lead break contact 12–1, opening the holding path for the SC3 relay. Since the SU relay is unoperated, and the SC2 relay is released, any further operation path for the SC3 relay ceases to exist. The SC3 relay therefore releases, opening the operation path for the ST1 relay, which opens the operation path of the ST2 relay. With the ST1, ST2, and SC3 relays released, the tip, ring and sleeve leads of the junctor are restored to an unbroken normal. The lines through the concentrator network are thus restored to normal.

A further service option may be provided to permit the release of junctor 9–5, removal of the split condition of junctor 9–3, and release the concentrator unit from the connection. The subscriber at the transferring station, upon hearing busy signal may elect to have the above described restoration operations performed without waiting for the timing out delay, by sending a short recall signal (hookswitch flash). The hookswitch flash is transmitted over the transmission path into the already established line circuit 4—4 of the interline switching means 4–3. The scanner G416 connected to the interline switching means detects this signal and causes a responsive signal to be transmitted over a data trunk G121 to the central programmed control unit. The central programmed control unit, acting on this recall signal notes the status of the connection in its call status store G700 (then an unanswered condition exists in the add-on trunk), and proceeds to restore conditions identical to those after the time-out situation described above.

If a subscriber at the transferred-to station does not answer, rather than being busy, the transferring subscriber hears the ringing signal in the normal manner. In a sequence of events simlar to that descrbed above wth respect to busy signal, the connection to the transferred-to subscriber is dropped and restored to normal by a timed-out interval in the central programmed control unit or by a hookswitch flash (recall signal) initiated by the transferring subscriber.

At the termination of the communication between the transferred-to subscriber and the subscriber terminated at the portion B of split junctor 9–3 terminated on the trunk link frame, disconnect signals are received over the transmission paths to the two terminating line circuits 4—4 in the interline switching means 4–3. Scanners such as scanner G416 detect both signals, and transmits this information over a data trunk G121 to the central programmed control unit for further processing. In response, the central programmed unit directs the interline switching means 4–3 over a data trunk G122 to release the internal transmission connection (time slot) between the two terminating line circuits 4—4 in the interline switching means 4–3, and to remove ground from the stop lead 12–1 which is in the holding path of the SC3 relay. The SC3, ST1 and ST2 relays, as well as the line concentrator 4–2 are thus restored to an idle condition as described above. Concurrently, the central programmed control unit sends a signal via the trunk seize and release circuit and the trunk control leads to the add-on trunk 4–5 to cause it to release junctor 9–5. Thus junctors 9–3 and 9–5 as well as the remainder of the trunk link network transmission path is restored to an idle condition.

4.5 Add-on

The sequence of events and operations in the aforementioned described equipment for add-on function are identical to those for a dial transfer function, up to the point where three subscribers are connected to the common transmission path. Thus the three subscribers may communicate with each other. The third subscriber has thus been "added on."

At the conclusion of the communication, if the "transferring" or now, "adding" subscriber opens his hookswitch by replacing his handset first, the sequence of operations for returning the equipment to an idle condition is as described earlier. However, if the subscriber's line eventually terminated on the portion B of junctor 9–3 connected to the trunk link frame terminates the call first, the central programmed control unit identifies a disconnect signal as coming from the line circuit in the interline switching means on which junctor portion B is terminated. Reference to the call status store G700 enables the central programmed control unit to send the proper instruction over a data trunk G122 to the interline switching means 4–3 to permit the connection to the add-on trunk 4–5 to be released and to remove ground from the stop lead in the digit and data link control. Thus the split condition of junctor 9–3 is removed, and the special service circuits are restored to normal. A signal is also sent from the central programmed control unit to the add-on trunk via the aforementioned control leads in order to disconnect it, and thus restore junctor 9–5 to normal.

4.5.1 Conference connections

The invention disclosed and described above for dial transfer and add-on features permits any subscriber terminated on the line link frame connected through a junctor having the aforementioned special service circuits to add additional stations to the connection. Because of losses in the transmission paths, it may be desirable to limit the number of stations taking part in a conference connection, and a typical system may allow only one incoming or outgoing trunk and four subscribers' lines connected to the common control system line link frames to engage in a conference. Such limitation may be effected by appropriate modifications to the program in the central programmed control unit. The program modifications are well within the skill or one skilled in the art understanding this invention.

Also, since there is no real requirement that the added-on station be terminated on the originating line link frame, a station may be added through an outgoing trunk to a remote common control or other type of switching system. This function is achieved in the normal manner when the to be added station directory digits are transferred to the completing marker from the add-on trunk, in a manner as if the common control system was operated as a tandem switching office.

It may also be seen that a subscriber having his line terminated on a remote switching unit 4–7, connected to the line link frame 10–1 via a central office trunk G111 may also be connected through a junctor having the above described special service circuits. With appropriate signalling, i.e. hookswitch flashes, he may be connected to any other subscriber terminated on the remote switching unit or on a line link frame in the common control system and be afforded the aforementioned special services.

I claim:

1. A telephone switching system comprising:
   (a) transmission paths;
   (b) first switching means for interconnecting the transmission paths;
   (c) a common controlling means connected to the switching means for controlling the operation of the switching means; and
   (d) programmed controlling means connected to *and acting in consort with* the common controlling means, for modifying the *sequence of* operation thereof in a program responsive manner, in response to a request by the common controlling means for such connection, upon recognition by the common controlling means of its inability to process a request for service from one of the transmission paths without such connection.

2. A telephone switching system as defined in claim 1 wherein the common controlling means is adapted to control the interconnection of first and second transmission paths by the switching means after digit-codes are received from over the first transmission path, and the programmed controlling means is adapted to be connected to, and modify the *sequence of* operation of the common controlling means in response to the reception of predetermined signals over predetermined ones of the first transmission paths.

3. *A telephone switching system comprising:*
   *(a) transmission paths;*
   *(b) first switching means for interconnecting the transmission paths;*

(c) *a common controlling means connected to the switching means for controlling the operation of the switching means;*

(d) *programmed controlling means connected to the common controlling means, for modifying the operation thereof in a program responsive manner, in response to a request by the common controlling means for such connection, upon recognition by the common controlling means of its inability to process a request for service from one of the transmission paths without such connection, wherein the common controlling means is adapted to control the interconnection of first and second transmission paths by the switching means after digit-codes are received from over the first transmission path, the programmed controlling means is adapted to be connected to, and modify the operation of the common controlling means in response to the reception of predetermined signals over predetermined ones of the first transmission paths;*

[A telephone switching system as defined in claim 2] *and further* wherein the common controlling means comprises:

[a] (e) digit registration means connected to one of said transmission paths for registering first digit-codes received over one of said transmission paths under control of the common controlling means;

(f) [b] number group means for translating the first digit-codes into indications of called transmission path locations for the common controlling means;

(g) [c] bidding means for requesting service of the programmed controlling means upon reception in the digit registration means of a predetermined one of the first digit-codes;

(h) [d] number group means bypass means for transmitting said predetermined digit code to the programmed controlling means, instead of the number group, in response to said predetermined digit-code; and (i) [e] first receiving means for receiving a translated second digit-code from the programmed controlling means, as if said translated digit-code had come from the digit registration means; and wherein the programmed controlling means comprises:

(1) a marker bid scanner connected to the bidding means for detecting a request for service therefrom, and for seizing the programmed controlling means;

(2) second receiving means for said predetermined digit-code connected to said number group bypass means;

(3) programmed means connected to said receiving means for translating said predetermined digit-code into said second digit-code; and (4) marker buffer translator means connected between the programmed means and said first receiving means for transmitting said second digit-code to the common controlling means as if the second digit-code had come from the digit registration means; whereupon the common controlling means causes the interconnection of a pair of transmission paths in accordance with said second digit-code, instead of said predetermined digit-code.

4. A telephone transmission system as defined in claim 3 further comprising means for indicating to the common control system classes of service associated with said first digit-codes, and wherein said predetermined digit-code corresponds to one of said first digit-codes designated by a predetermined class of service.

5. A telephone system as defined in claim 3 wherein the programmed controlling means further comprises data receiver translator means connected to the marker bid scanner for translating said request into a code recognizable by the programmed controlling means which designates the number group bypass means ready to transmit said predetermined digit-code to the programmed controlling means.

6. A telephone system as defined in claim 3 further comprising:

(a) a marker connected to the switching network for controlling the interconnection of a first transmission path to a second transmission path, and having a temporary digit storage means;

(b) a first connector means interconnecting the digit registration means and said digit storage means of the marker after receipt by the digit registration means of a predetermined prefix and number of digits; or a non-predetermined prefix and number of digits;

(c) a second connector means interconnecting the number group means and said digit storage means of the marker after interconnection of the digit registration means and the marker by the first connector means and after receipt by the digit registration means of said non-predetermined prefix and number of digits; the second connector means comprising said bypass means, and said bidding means adapted to request service of the programmed controlling means after receipt by the digit registration means of said predetermined prefix and number of digits; and (d) the first receiving means being disposed within the marker, and comprising said digit storage means.

7. A telephone system as defined in claim 3, wherein the marker buffer translator means comprises the second receiving means, adapted to translate the first digit-codes from the number group bypass means into a code recognizable by the programmed controlling means, and to translate the second digit-code from the programmed controlling means into a code recognizable by the first receiving means.

8. *A telephone switching system comprising:*

*a. transmission paths;*

*b. first switching means for interconnecting the transmission paths;*

*c. a common controlling means connected to the switching means for controlling the operation of the switching means;*

*d. programmed controlling means connected to the common controlling means, for modifying the operation thereof in a program responsive manner, in response to a request by the common controlling means for such connection, upon recognition by the common controlling means of its inability to process a request for service from one of the transmission paths without such connection; wherein the common controlling means is adapted to control the interconnection of first and second transmission paths by the switching means after digit-codes are received from over the first transmission path, the programmed controlling means is adapted to be connected to, and modify the operation of the common controlling means in response to the reception of predetermined signals over predetermined ones of the first transmission paths;*

[A telephone switching system as defined in claim 2] *said system* further comprising:

*e.* [a] a second switching means, controlled from the programmed controlling means;

*f.* [b] a third transmission path connected to the second switching means; and

*g.* [c] the third transmission path being connected, through the second and first switching means, to the first and second transmission paths upon reception by said switching system of a predetermined type of request for interconnection service signal from the first transmission path.

9. *A telephone switching system comprising:*

*a. transmission paths;*

*b. first switching means for interconnecting the transmission paths;*

*c. a common controlling means connected to the switching means for controlling the operation of the switching means;*

*d. programmed controlling means connected to the common controlling means, for modifying the operation thereof in a program responsive manner, in response to a request by the common controlling means for such connection, upon recognition by the common controlling means of its inability to process a request for service from one of the transmission paths without such connection; wherein the common controlling means is adapted to control the interconnection of first and second transmission paths by the switching means after digit-codes are received from over the first transmission path, the programmed controlling means is adapted to be connected to, and modify the operation of the common controlling means in response to the reception of predetermined signals over predetermined ones of the first transmission paths;*

[A telephone switching system as defined in claim 2] *said system* further comprising:

*e* [a] an interline switching means comprising a second switching means, controlled by the programmed controlling means, connected to the first switching means upon reception by the switching system of a predetermined type of request for interconnection service signal from the first transmission path;

*f.* [b] a third transmission path connected to the interline switching means;

*g.* [c] means for connecting the third transmission path selected after reception by the programmed controlling means of a digit-code from the first transmission path, designating said third path, to said first and second paths, in the interline switching means; and

*h.* [d] means for disconnecting the first or second transmission path from the third transmission path in response to the reception of predetermined signals by the programmed controlling means through the interline switching means from the first transmission path.

10. A telephone switching system as defined in claim 9 wherein the switching means comprises a line link frame, a trunk link frame and junctors having tip, ring, and sleeve leads interconnecting the line link frame and the trunk link frame; the first and second transmission paths being comprised of subscribers' lines terminated on the line link frame and trunks terminated on the trunk link frame.

11. A telephone switching system as defined in claim 9 including junctor splitting means for selectively open circuiting the tip, ring and sleeve leads of predetermined junctors in response to a predetermined signal from the first transmission path, resulting in A and B junctor end portions, said splitting means causing termination and holding of said two junctor end portions at different line circuits of the interline switching means; and further including add-on trunk means, connected between the trunk link frame and a line circuit of the interline switching means, which is connected, under control of the programmed controlling means and common control system, to the third transmission path.

12. A telephone switching system as defined in claim 11, wherein the junctor splitting means comprises means for detecting a hookswitch flash signal but being unaffected by dial pulse, intelligence transmission and ringing signals transmitted via said predetermined junctors; and in response to said detection open circuiting said junctors and terminating said end portions at individual line circuits of the interline switching means, while providing signals to said end portions such that any circuits connected to the transmission paths terminated on the two junctor portions are held as if said junctor ends were joined.

13. A telephone switching system as defined in claim 12 further including concentrator means connected between said end portions and the interline switching means.

14. A telephone switching system as defined in claim 2 further comprising:

a. remote switching means for interconnecting a multiplicity of remote subscribers' lines, controlled by the programmed controlling means; and b. trunk means, controlled by the programmed controlling means, connected between the remote switching means and the first switching means, whereby digits received by the common controlling means from a transmission path connected to the first switching means designating completion of a transmission path through the first switching means to a remote subscriber's line are transferred to the programmed controlling means and used thereby to interconnect a remote subscriber's line in the remote switching means to the trunk means, and used by the common control means to interconnect a transmission path through the first switching means to the trunk means terminated thereon.

15. A telephone switching system as defined in claim 3, further including:

a. remote switching means interconnecting a multiplicity of remote subscribers' lines, controlled by the programmed controlling means; and b. trunk means connected to the programmed controlling means, and between the remote switching means and the first switching means, wherein said predetermined digit code designates a remote subscriber's line which is to be connected to one of said transmission paths, and said translated second digit code designates an idle trunk means, said programmed controlling means comprising means for sensing an idle trunk means and seizing said trunk means, and transmitting means for transmitting the predetermined digit-code to the remote switching means and transmitting the translated second digit-code designating said trunk means to the marker, whereby one of the transmission paths is connected by the common controlling means to said trunk means in the first switching means, and the trunk is connected in the remote switching means under control of the programmed controlling means to a second transmission path in the remote switching means.

16. A telephone switching system as defined in claim 14 further comprising a data link and a signalling trunk each connected between the remote switching means and the programmed controlling means.

17. A telephone switching system as defined in claim 15 wherein said transmitting means comprises a marker buffer translator.

18. A telephone switching system as defined in claim 15 wherein the remote switching means is controlled by the programmed controlling means via a data link and signalling trunk, said trunk means is controlled by the programmed controlling means, and wherein the transmitting means comprises means for transmitting the predetermined digit code directly to the remote switching means via the data link and signalling trunk.

19. A telephone switching system as defined in claim 15 wherein the remote switching means is self-controlled, said trunk means comprises means for being seized and signalled by the programmed controlling means, and wherein the transmitting means comprises means for transmitting the predetermined digit-code directly to said trunk means so as to cause the remote switching means to connect a transmission path to said trunk.

20. A telephone switching system as defined in claim 19 including trunk scanning means connected between said trunk means and the programmed controlling means for sensing the idle or busy state of said trunk means.

21. A telephone switching system as defined in claim 20 wherein said transmitting means comprises a trunk buffer translator.

22. A method of controlling the interconnection of a first transmission path with another transmission path in a common control switching system comprising:

a. detecting a request for a predetermined service function over the first transmission path, which the common control switching system is not capable of performing by itself;

b. connecting a programmed controlling means to the common control switching system;

c. translating the request for said service function within the programmed controlling means to a second request for service function capable of being performed by the common control switching system in consort with the programmed controlling means; and d. completing the interconnection of said transmission paths in accordance with the translated *second* request for service function.

23. A method of controlling the interconnection of a first transmission path with another transmission path as defined in claim [8] *22*, wherein the request for a predetermined service function is in a form comprising a predetermined set of digits; the translating step (c) comprising translating the predetermined set of digits into another set of digits by the programmed controlling means; and completing step (d) comprising substituting said other set of digits for the predetermined set of digits in the common control switching system, and controlling the interconnection of said transmission paths in accordance with the other set of digits by the common control switching system.

24. A method as defined in claim 23 further including the step of storing, within the programmed controlling means after connection to the common control switching system, a set of digits which follows a predetermined prefix in said predetermined set of digits, for subsequent substitution as the other set of digits.

25. A method as defined in claim 24 including the steps of detecting the storage of the predetermined set of digits and marking said detection in a predetermined place of registration, scanning, prior to connecting of the programmed controlling means to the common control switching system, the predetermined places of registration of digits in the common control system for said marking, indicating to the programmed controlling means, prior to its connection to said system, that such detection has taken place and what place of registration contains the marking of such detection.

26. A method as defined in claim 24 wherein the predetermined set of digits contains a prefix code and a following set of digits fewer in number than that normally required to identify a called subscriber; said other set of digits identifying a called subscriber by its normal full number of digits, whereby the prefix code and said following digits are received over the first transmission path, and the substituted full set of digits is used by the common control system to identify a second transmission path to which the first transmission path is to be connected.

27. A method of interconnecting a third transmission path with a first and second transmission path in a common control switching system comprising:

a. opening a junctor connected between the first and second transmission paths, upon initiation by a predetermined type of request for interconnection service signal sent over the first transmission path;

b. terminating the first and second transmission paths in individual first and second line circuits of an interline switching means which is controlled by a programmed controlling means;

c. selecting a third transmission path, after reception of third transmission path designating digits by the programmed controlling means through the interline switching means from the first transmission path;

d. terminating the third transmission path in a third line circuit of the interline switching means; and e. interconnecting the first, second and third transmission paths in the interline switching means under control of the programmed controlling means.

28. A method as defined in claim 27 including the steps of:

a. connecting the first and third transmission paths in the interline switching means; and b. interconnecting the second transmission path to the first and third transmission paths in the interline switching means after reception by the programmed controlling means of a hookswitch flash signal from the first transmission path.

29. A method of interconnecting a third transmission path with a first and second transmission path in a common control switching system comprising:

a. extending a first subscriber's line in the common control switching system via a line link frame, junctor and trunk link frame to a trunk extending to a second subscriber's line;

b. opening the junctor upon initiation of a predetermined signal over the junctor from the first transmission path, to form A and B junctor end portions, with said A portion connected to the first subscriber's line, and said B portion connected to the second subscriber's line;

c. terminating said junctor end portions in individual line circuits of an interline switching means;

d. selecting an add-on trunk terminated in a line circuit of the interline switching means, in response to the reception of dialed digits from the first subscriber's line, designating a third subscriber's line, by programmed controlling means for the interline switching means;

e. connecting the add-on trunk via the common control switching system to the third subscriber's line;

f. connecting the line circuit in the interline switching means connected to the add-on trunk to the line circuit in the interline switching means connected to the first subscriber's line;

g. interconnecting the line circuit in the interline switching means connected to the second subscriber's line with the line circuits connecting the first and third subscriber's lines.

30. A method as defined in claim 29 including the further step of disconnecting the line circuit in the interline switching means leading to the first subscriber's line upon reception of a disconnect signal therefrom.

31. A method as defined in claim 29 further including the steps of:

a. disconnecting the line circuit in the interline switching means connected to the first subscriber's line from the other line circuit upon reception of a hookswitch flash signal from the first subscriber's line;

b. selecting another add-on trunk terminated in a line circuit of the interline switching means in response to the reception by the programmed controlling means of dialed digits from the first subscriber's line designating another subscriber's line;

c. connecting the other add-on trunk via the common control system to the other subscriber's line;

d. interconnecting the line circuits in the interline switching means respectively connected to the other add-on trunk and the first subscriber's line;

e. interconnecting the line circuit in the interline switching means connected to the second subscriber's line and add-on trunk with the line circuits in the interline switching means connecting the first subscriber's line and the other add-on trunk.

*32. A telephone switching system comprising:*

*a. transmission paths;*

*b. first switching means for interconnecting the transmission paths;*

*c. a common controlling means including a marker and a plurality of number groups, for controlling the operation of said switching means and for detecting*

*a request for a predetermined service function which the common controlling means is not capable of performing by itself; and*

*d. programmed controlling means connected to the common controlling means, for translating the request for service function to a second request for service which said marker can handle with the use of one of said number groups, whereby the operation of said common controlling means is modified in a program responsive manner.*

*33. A telephone switching system comprising:*

*a. transmission paths;*

*b. first switching means for interconnecting the transmission paths;*

*c. a common controlling means connected to the switching means for controlling the operation of said switching means;*

*d. means for detecting a first request for a predetermined service function which the common controlling means is not capable of performing by itself; and*

*e. programmed controlling means connected to and acting in consort with the common controlling means responsive to said detection for modifying the sequence of the common controlling means operation for translating the request for said predetermined service function into a second request for service which said common controlling means can handle to cause said switching system to give said predetermined service function.*

References Cited

The following references, cited by the Examiner, are of record in the patented file of this patent or the original patent.

UNITED STATES PATENTS

| | | | |
|---|---|---|---|
| 3,479,467 | 11/1969 | Kirby et al. | 179—18 ES |
| 3,270,139 | 8/1966 | Benmussa et al. | 179—18 E |
| 2,951,908 | 9/1960 | Malthaner et al. | 179—18 BD |

THOMAS W. BROWN, Primary Examiner

U.S. CL. X.R.

179—18 B